(12) United States Patent
Miller et al.

(10) Patent No.: US 12,116,929 B2
(45) Date of Patent: Oct. 15, 2024

(54) BLEED FLOW ASSEMBLY FOR A GAS TURBINE ENGINE

(71) Applicant: General Electric Company, Schenectady, NY (US)

(72) Inventors: Brandon Wayne Miller, Liberty Township, OH (US); Scott David Hunter, Seattle, WA (US); Patrick Michael Marrinan, Cincinnati, OH (US); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/578,795

(22) Filed: Jan. 19, 2022

(65) Prior Publication Data

US 2023/0228214 A1 Jul. 20, 2023

(51) Int. Cl.
| | |
|---|---|
| *F02C 6/08* | (2006.01) |
| *B64D 13/06* | (2006.01) |
| *F02C 9/00* | (2006.01) |
| *F02C 9/18* | (2006.01) |
| *F02K 3/04* | (2006.01) |

(52) U.S. Cl.
CPC ............... *F02C 6/08* (2013.01); *B64D 13/06* (2013.01); *F02C 9/00* (2013.01); *F02C 9/18* (2013.01); *F02K 3/04* (2013.01); *B64D 2013/0603* (2013.01); *B64D 2013/0607* (2013.01); *B64D 2013/0618* (2013.01); *B64D 2013/0648* (2013.01); *F05D 2220/32* (2013.01); *F05D 2220/76* (2013.01)

(58) Field of Classification Search
CPC ..... F02C 9/18; F02C 6/06; F02C 6/08; B64D 15/00; B64D 15/02; B64D 15/04; B64D 13/06; B64D 2013/0603; B64D 2013/0607; B64D 2013/0618; B64D 2033/0233
See application file for complete search history.

(56) References Cited

U.S. PATENT DOCUMENTS

| | | | |
|---|---|---|---|
| 2,514,105 A * | 7/1950 | Thomas | ............... B64D 15/02 165/44 |
| 2,634,581 A | 4/1953 | Kent | |
| 2,663,993 A | 12/1953 | Mosser | |

(Continued)

FOREIGN PATENT DOCUMENTS

| | | |
|---|---|---|
| CN | 101922312 | 12/2010 |
| FR | 1038694 A | 9/1953 |
| GB | 2403778 A | 1/2005 |

*Primary Examiner* — Alain Chau
(74) *Attorney, Agent, or Firm* — Dority & Manning, P.A.

(57) ABSTRACT

A gas turbine engine includes a turbomachine, the turbomachine defining a core flow therethrough during operation. A first heat exchange assembly is in fluid communication with the turbomachine for receiving a first bleed flow from the turbomachine. A second heat exchange assembly is in fluid communication with the turbomachine for receiving a second bleed flow from the turbomachine. A first flow outlet is provided for receiving the first bleed flow from the first heat exchange assembly and providing the first bleed flow to a first aircraft flow assembly. A second flow outlet is provided for receiving the second bleed flow and providing the second bleed flow from the second heat exchange assembly to a second aircraft flow assembly.

16 Claims, 11 Drawing Sheets

(56) References Cited

U.S. PATENT DOCUMENTS

| | | | | |
|---|---|---|---|---|
| 3,540,682 | A | 11/1970 | Dibble et al. | |
| 3,933,327 | A * | 1/1976 | Cook | B64D 15/04 |
| | | | | 244/134 B |
| 3,981,466 | A | 9/1976 | Shah | |
| 4,688,745 | A | 8/1987 | Rosenthal | |
| 4,779,644 | A * | 10/1988 | Benson | B64D 13/00 |
| | | | | 60/39.15 |
| 5,010,729 | A | 4/1991 | Adamson et al. | |
| 5,088,277 | A * | 2/1992 | Schulze | F02C 7/047 |
| | | | | 60/39.093 |
| 6,702,233 | B1 * | 3/2004 | DuPont | B64D 15/04 |
| | | | | 244/134 B |
| 7,055,304 | B2 | 6/2006 | Courtot et al. | |
| 7,246,773 | B2 | 7/2007 | Stoner et al. | |
| 7,374,404 | B2 | 5/2008 | Schilling | |
| 7,789,620 | B2 | 9/2010 | Vontell, Sr. et al. | |
| 7,926,261 | B2 | 4/2011 | Porte | |
| 8,015,826 | B2 * | 9/2011 | Myers | F01K 13/02 |
| | | | | 60/785 |
| 8,397,487 | B2 | 3/2013 | Sennoun et al. | |
| 8,529,188 | B2 | 9/2013 | Winter | |
| 8,677,764 | B2 | 3/2014 | Porte | |
| 8,689,538 | B2 | 4/2014 | Sankrithi et al. | |
| 8,943,796 | B2 | 2/2015 | McCaffrey | |
| 8,955,794 | B2 * | 2/2015 | Mackin | F02C 6/12 |
| | | | | 244/134 R |
| 9,045,991 | B2 | 6/2015 | Read et al. | |
| 9,109,514 | B2 | 8/2015 | Cheong | |
| 9,114,877 | B2 | 8/2015 | Weber et al. | |
| 9,222,411 | B2 * | 12/2015 | Sennoun | F02C 6/08 |
| 9,239,005 | B2 | 1/2016 | Strecker et al. | |
| 9,447,732 | B2 * | 9/2016 | Mazumder | F02C 7/08 |
| 9,540,094 | B2 | 1/2017 | Negulescu et al. | |
| 9,624,831 | B2 * | 4/2017 | Brousseau | F02K 3/115 |
| 9,695,751 | B2 | 7/2017 | Kupratis et al. | |
| 9,874,109 | B2 | 1/2018 | Hatcher, Jr. et al. | |
| 9,879,599 | B2 | 1/2018 | Mercier et al. | |
| 9,945,247 | B2 | 4/2018 | Appukuttan et al. | |
| 10,054,051 | B2 * | 8/2018 | Foutch | F02C 7/36 |
| 10,054,052 | B2 | 8/2018 | Zheng et al. | |
| 10,100,733 | B2 | 10/2018 | O'Toole et al. | |
| 10,113,444 | B2 | 10/2018 | Huang et al. | |
| 10,145,301 | B2 | 12/2018 | Abrari et al. | |
| 10,173,780 | B2 | 1/2019 | Mackin et al. | |
| 10,184,340 | B2 | 1/2019 | Baltas et al. | |
| 10,189,572 | B2 | 1/2019 | Mackin et al. | |
| 10,239,626 | B2 | 3/2019 | Herchenroder et al. | |
| 10,240,526 | B2 | 3/2019 | Suciu et al. | |
| 10,288,010 | B2 | 5/2019 | Houston et al. | |
| 10,288,083 | B2 | 5/2019 | Miller et al. | |
| 10,294,873 | B2 * | 5/2019 | Papa | F02C 7/047 |
| 10,344,711 | B2 | 7/2019 | Hsu | |
| 10,378,554 | B2 | 8/2019 | Yu et al. | |
| 10,399,664 | B2 | 9/2019 | Bowden et al. | |
| 10,557,415 | B2 | 2/2020 | Boudebiza et al. | |
| 10,563,513 | B2 | 2/2020 | Kalitzin et al. | |
| 10,634,065 | B2 * | 4/2020 | Bruno | F02C 6/08 |
| 10,690,146 | B2 | 6/2020 | Urac et al. | |
| 10,711,797 | B2 | 7/2020 | Kroger et al. | |
| 10,724,435 | B2 | 7/2020 | Kroger et al. | |
| 10,794,292 | B2 | 10/2020 | Kupratis et al. | |
| 10,794,396 | B2 | 10/2020 | Kroger et al. | |
| 10,801,442 | B2 | 10/2020 | Clements et al. | |
| 10,815,886 | B2 | 10/2020 | Kroger et al. | |
| 10,822,999 | B2 | 11/2020 | Morris et al. | |
| 10,823,114 | B2 | 11/2020 | Clements et al. | |
| 10,837,361 | B2 | 11/2020 | Abrari et al. | |
| 10,948,108 | B2 * | 3/2021 | Yang | F28F 1/06 |
| 2001/0023582 | A1 | 9/2001 | Nagel | |
| 2009/0277181 | A1 | 11/2009 | Druon et al. | |
| 2010/0154434 | A1 * | 6/2010 | Kubota | F02C 7/18 |
| | | | | 60/785 |
| 2010/0251727 | A1 * | 10/2010 | Myers | F02C 9/18 |
| | | | | 60/773 |
| 2012/0240594 | A1 | 9/2012 | Shamara | |
| 2012/0241561 | A1 | 9/2012 | Shamara | |
| 2013/0164115 | A1 * | 6/2013 | Sennoun | F02C 7/185 |
| | | | | 415/1 |
| 2013/0192263 | A1 | 8/2013 | Suciu et al. | |
| 2014/0000279 | A1 * | 1/2014 | Brousseau | F02K 3/075 |
| | | | | 60/785 |
| 2014/0144124 | A1 * | 5/2014 | Mazumder | F04D 27/0207 |
| | | | | 60/39.093 |
| 2014/0250898 | A1 * | 9/2014 | Mackin | F02C 7/047 |
| | | | | 60/785 |
| 2015/0121842 | A1 * | 5/2015 | Moes | F02C 6/08 |
| | | | | 60/225 |
| 2015/0176501 | A1 * | 6/2015 | Mackin | F02C 6/08 |
| | | | | 415/144 |
| 2015/0275758 | A1 * | 10/2015 | Foutch | F02C 7/047 |
| | | | | 60/785 |
| 2015/0354464 | A1 * | 12/2015 | Hillel | F04D 27/0261 |
| | | | | 415/144 |
| 2016/0017751 | A1 | 1/2016 | Caruel | |
| 2016/0090917 | A1 * | 3/2016 | Bruno | F02C 9/18 |
| | | | | 415/145 |
| 2016/0195010 | A1 | 7/2016 | Roberge | |
| 2017/0074172 | A1 * | 3/2017 | Little | F02C 6/08 |
| 2017/0184030 | A1 * | 6/2017 | Brousseau | F02K 3/06 |
| 2017/0267360 | A1 * | 9/2017 | Heid | F02C 9/18 |
| 2018/0009536 | A1 * | 1/2018 | Christopherson | F01D 17/145 |
| 2018/0057173 | A1 * | 3/2018 | Sautron | B64D 13/06 |
| 2018/0111693 | A1 * | 4/2018 | Shea | B64D 13/06 |
| 2018/0141665 | A1 * | 5/2018 | Bezold | F02C 6/08 |
| 2018/0216538 | A1 * | 8/2018 | Papa | B64D 15/04 |
| 2018/0320801 | A1 * | 11/2018 | Yang | F28F 1/06 |
| 2019/0107119 | A1 | 4/2019 | Yu et al. | |
| 2019/0202567 | A1 * | 7/2019 | Epp | B64D 15/04 |
| 2019/0226402 | A1 | 7/2019 | Kray et al. | |
| 2020/0002007 | A1 * | 1/2020 | Retersdorf | B64D 13/06 |
| 2020/0049077 | A1 | 2/2020 | Schwarz et al. | |
| 2020/0149421 | A1 | 5/2020 | Lad | |
| 2020/0355121 | A1 * | 11/2020 | O'Meallie | F02C 7/277 |
| 2021/0078715 | A1 | 3/2021 | Bevirt et al. | |
| 2021/0108597 | A1 | 4/2021 | Ostdiek et al. | |

\* cited by examiner

BLEED FLOW ASSEMBLY FOR A GAS TURBINE ENGINE

FIELD

The present subject matter relates generally to a bleed flow assembly for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator. A bleed flow assembly may generally be provided to bleed airflow from the turbomachine to be used in various operations. Use of bleed flow may impact turbomachine operation, such that bleed flow must be managed in view of both bleed flow and turbomachine demands.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
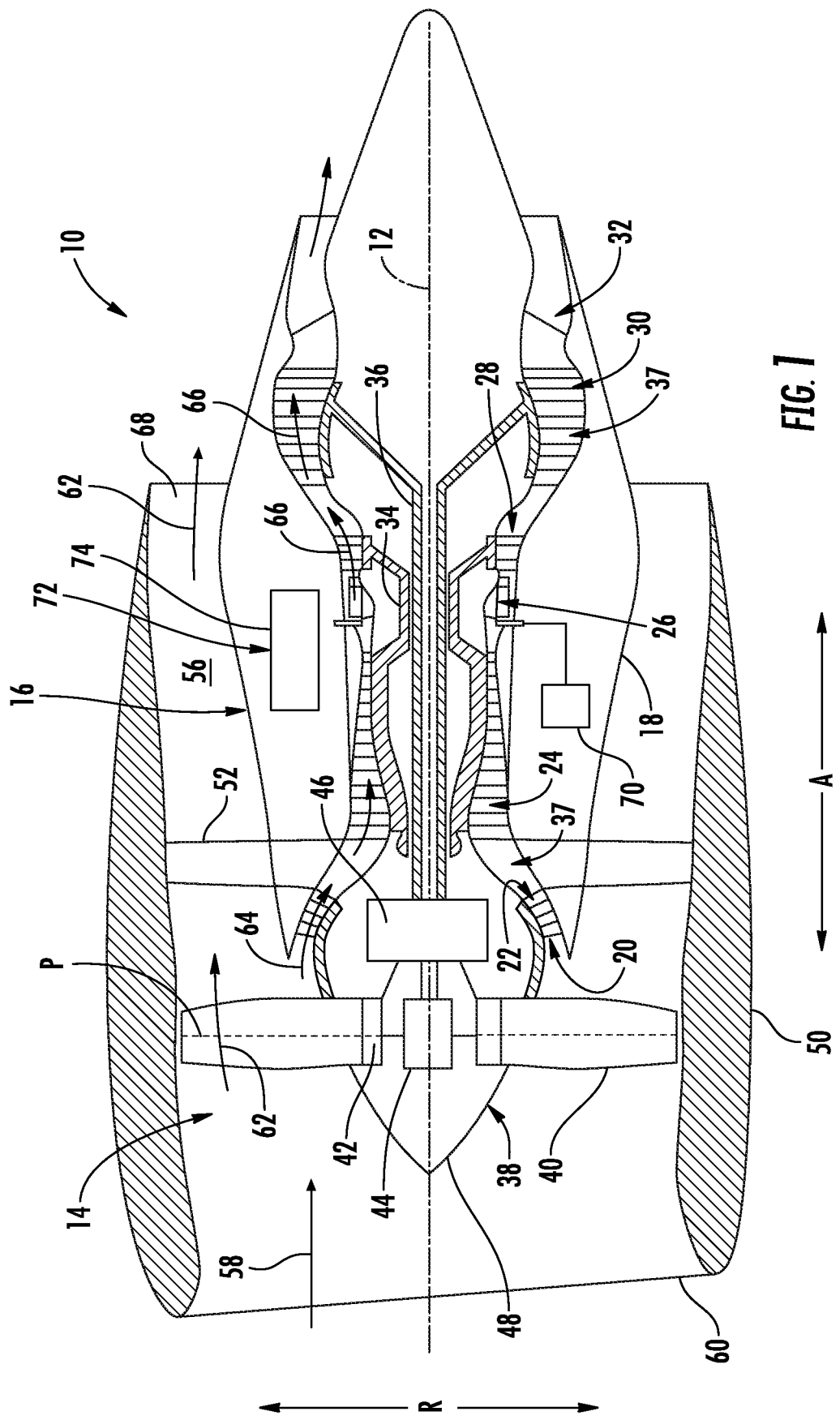
FIG. 1 is a schematic, cross-sectional view of an exemplary gas turbine engine according to various embodiments of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "combustion engine" refers to turbomachinery components used in generation of a torque output through forces imparted by combustion reactions. The combustion engine may be described independently of other propulsion or power generation components such as electrical or fuel cell components.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

Systems and methods are provided for operating a bleed assembly for a gas turbine engine. The bleed assembly includes at least one flow tap configured to receive a bleed flow from a core flow of a turbomachine. This bleed flow is then redirected to various bleed flow components of the gas turbine engine or an aircraft to which the gas turbine engine is mounted, such as anti-icing and/or cabin environmental control systems. The present disclosure seeks to provide systems and methods to avoid engine operability issues, such as stall and surge issues, while providing a relatively large amount of bleed flow. The inventors of the present disclosure have found that removing a high percentage of bleed flow relative to the core flow required for some bleed flow components benefits from configuration and operation to reduce and/or recapture energy drawn from a given flow tap of the turbomachine. For example, systems and methods may be provided to enable high bleed flow and preferred turbomachine operation by recapturing energy from the bleed flow for use in supplementing turbomachine power. Additionally or alternatively, bleed flow from a compressor section may be supplemented with post-combustion bleed flow from downstream of a combustion section of the turbomachine.

Additionally, the inventors of the present disclosure have further found that downstream bleed flow components may benefit from such systems and methods as referenced above to recapture bleed flow energy. For example, pressures and temperatures may be reduced to safe levels in energy recapture operations, thus providing bleed flow resources to components that otherwise would not be sufficiently resilient to safely handle those bleed flow resources. Accordingly, systems and methods to conform bleed flow resources to requirements of various bleed flow components would be useful. Additionally, various bleed flow components may be configured to operate in broader conditions and/or with lighter or more cost-effective construction to take advantage of the handling of these bleed flow resources provided herein.

For example, in one exemplary aspect of the present disclosure, a gas turbine engine is provided having a turbomachine, a bleed assembly, and a flow outlet. The bleed assembly may be configured to receive a bleed flow from the turbomachine, and may include a bleed flow machine (e.g., a bleed air turbine) having a machine outlet and configured to drive a machine load (e.g., an accessory gearbox, an electric machine, etc.) to capture an energy within the bleed flow. Further, the machine outlet is configured to receive the bleed flow during operation of the gas turbine engine having a mass flow rate equal to at least twelve percent (12%) of a core mass flow rate of a core flow through the turbomachine, e.g., during an aircraft wing icing operation. In such a manner, the gas turbine engine may be designed to provide a relatively high volume of airflow to the aircraft for, e.g., wing de-icing operation, while minimizing an energy loss associated with such a high volume of engine bleed.

In another exemplary aspect of the present disclosure, a gas turbine engine is provided having a turbomachine, a first heat exchange assembly, a second heat exchange assembly, a first aircraft flow assembly, and a second aircraft flow assembly. The first heat exchange assembly may be configured to receive a first bleed flow from the turbomachine and to provide the first bleed flow to the first aircraft flow assembly. The second heat exchange assembly may be configured to receive a second bleed flow from the turbomachine and to provide the second bleed flow to the second aircraft flow assembly. In such a manner, parallel flow paths provided to first and second aircraft flow assemblies may facilitate efficient use of bleed flow for different aircraft flow assembly tasks. For example, by dividing a wing de-icing operation from a cabin environmental control operation, various components along first and second bleed flows may be sized, shaped, and configured to meet distinct design requirements, leading to more narrowly tailored component design for each task.

In yet another exemplary aspect of the present disclosure, a gas turbine engine is provided having a turbomachine, a first flow tap configured to receive a first bleed flow from upstream of the combustion section, and a second flow tap configured to receive a second bleed flow from downstream of the combustion section. A first flow outlet may be provided in fluid communication with the first flow tap and a second flow outlet may be provided in fluid communication with the second flow tap. The first and second flow outlets are configured to direct the first and second bleed flows to at least one aircraft flow assembly. In such a manner, bleed flow from upstream of the combustion section may be supplemented by bleed flow from downstream of the combustion section, thus reducing an amount of upstream bleed required to meet the same aircraft flow assembly needs.

In yet another exemplary aspect of the present disclosure, a gas turbine engine is provided having a turbomachine, a flow tap in fluid communication with the turbomachine, and a bleed assembly. The bleed assembly may include a machine load and a bleed flow machine. A bleed regulator may be provided to regulate a bleed output provided to the bleed flow machine by controlling a capture rate of the bleed flow by the bleed flow machine. In such a manner, the bleed flow regulator may enable variable control of resistance to flow through the bleed flow machine, allowing tuning of such a system. For example, an increased demand of on the machine load may be met and/or a demand of higher pressure flow downstream of the bleed flow machine may be met by adjustment of such a system.

Referring now to the drawings, wherein identical numerals indicate the same elements throughout the figures, FIG. 1 is a schematic, cross-sectional view of an aeronautical gas turbine engine in accordance with an exemplary embodiment of the present disclosure. More particularly, for the embodiment of FIG. 1, the aeronautical gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and jet exhaust nozzle section 32 together define at least in part a core air flowpath 37 through the turbomachine 16. A high pressure (HP) shaft or spool 34 (or rather a high pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 68 of the turbofan engine 10, also providing propulsive thrust.

Moreover, as is depicted schematically, the exemplary turbofan engine 10 is part of a gas turbine engine, the gas turbine engine further including various accessory systems to aid in the operation of the turbofan engine 10 and/or an aircraft including the exemplary turbofan engine 10. For example, as is depicted, the exemplary gas turbine engine further includes a fuel delivery system 70 operable with the combustion section 26 of the turbomachine 16 of the turbofan engine 10 for providing fuel to the combustion section 26. The exemplary fuel delivery system 70 may include one or more fuel delivery lines, a fuel pump (not shown), etc. Further, the exemplary gas turbine engine includes a bleed assembly 72, as will be explained in greater detail below. It will be appreciated that the bleed assembly 72 generally includes a bleed flow machine 74 configured to receive a bleed airflow from the turbomachine 16. The bleed flow machine 74 may generally operate to convert energy in the bleed airflow into mechanical work, which may also be referred to herein as a bleed output. It should also be appreciated that the bleed output may represent another form of energy, such as electrical potential energy. Accordingly, the bleed flow machine 74 may produce useful work for the turbofan engine. Additionally, the bleed flow machine 74 may be operable to reduce energy of airflow to desired levels, for example to meet temperature and/or pressure limits of downstream components. Such reduced energy airflow may be used for a variety of purposes within, e.g., the turbofan engine 10, an aircraft (with which the turbofan engine 10 is installed; not shown), etc. for use within an environmental control system (ECS) of an aircraft, for use in wing anti-icing (WAI; providing anti-ice operations for a wing of an aircraft) and/or nacelle anti-icing (NAI; providing anti-ice operations for a nacelle of an engine, such as nacelle 50 of the turbofan engine 10 of FIG. 1) operations, etc.

Figure 2:
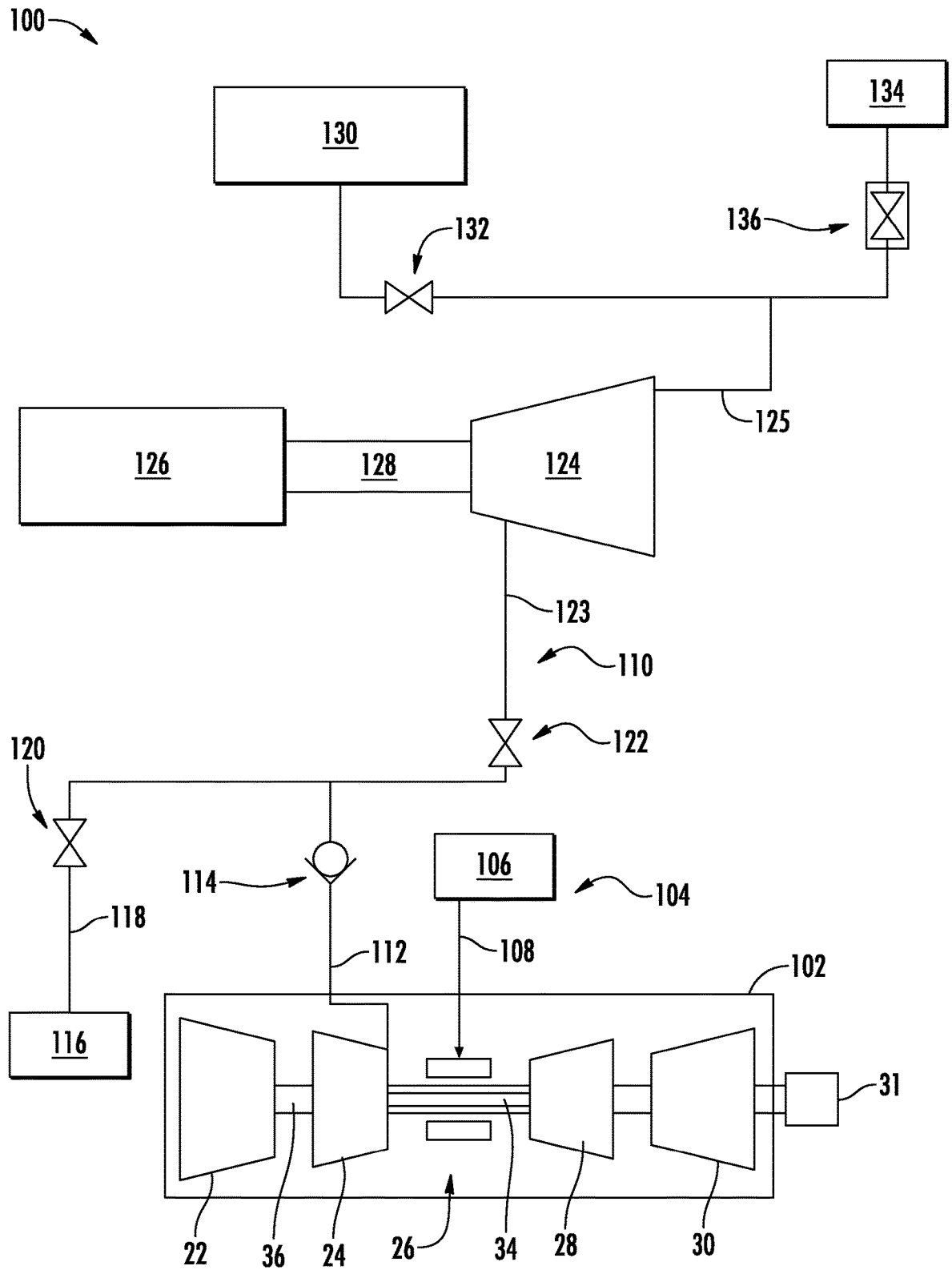
FIG. 2 is a schematic diagram of a bleed assembly for a gas turbine engine in accordance with an exemplary embodiment of the present disclosure.

Referring now to FIG. 2, a schematic diagram is provided of a bleed assembly 100 for a gas turbine engine in accordance with an exemplary embodiment of the present disclosure. The exemplary gas turbine engine of FIG. 2 may be configured in substantially the same manner as the exemplary turbofan engine 10 described above with reference to FIG. 1. For example, the exemplary gas turbine engine of FIG. 2 generally includes a turbomachine 102. The gas turbine engine may be, e.g., a turbofan engine, a turboprop engine, turboshaft engine, turbojet engine, etc.

As described above, the gas turbine engine used with the bleed assembly 100 of FIG. 2 may be configured in a similar manner as the turbofan engine 10 of FIG. 1 described above. Accordingly, the turbomachine 102 of FIG. 2 may generally include, as described above, a compressor section having a low pressure (LP) compressor 22 and a high pressure (HP) compressor 24; a combustion section 26; and a turbine section including a high pressure (HP) turbine 28 and a low pressure (LP) turbine 30. The compressor section, combustion section 26, and turbine section are arranged in serial flow order. A high pressure (HP) shaft or spool 34 drivingly 0connects the HP turbine 28 to the HP compressor 24, and a low pressure (LP) shaft or spool 36 drivingly connects the LP turbine 30 to the LP compressor 22.

As further shown in FIG. 2, an electric machine 31 may be provided in connection with the gas turbine engine. As depicted, the electric machine 31 is mechanically connected with the turbomachine 102 through the LP shaft 36. It should be appreciated that the electric machine 31 may be operable to drive the turbomachine 102 and/or generate electrical energy from rotation of the turbomachine 102. For example, the electric machine 31 may be operable to provide supplemental drive torque to the turbomachine 102 to increase engine operability margin, e.g., to reduce the chances of engine stall.

Further, the arrangement of FIG. 2 includes a fuel delivery system 104 (which may be configured in a similar manner as the fuel delivery system 70 of FIG. 1) operable with the combustion section 26 of the turbomachine 102 for providing fuel to the combustion section 26 of the turbomachine 102. As depicted in FIG. 2, a fuel source 106 is provided to supply fuel to the combustion section 26 through a fuel delivery line 108.

As depicted in FIG. 2, the exemplary bleed assembly 100 includes a bleed flow path 110 in fluid communication with the compressor section of the turbomachine 102. More specifically, the bleed flow path 110 may be in fluid communication with the HP compressor 24 as depicted. In the embodiment of FIG. 2, a flow tap 112 is provided from the HP compressor 24 to the bleed flow path 110. For example, the flow tap 112 may be provided at a specific stage of the HP compressor 24 such as a fourth stage. It should be appreciated that the flow tap 112 may draw from various other sources of pressure, for example the turbomachine 102. In various embodiments, a source of the flow tap 112 is selected on the basis of temperature and/or pressure requirements of the bleed assembly 100. It should also be appreciated that more than one of the flow tap 112 may be provided, for example to meet varied temperature and/or pressure requirements of the bleed assembly 100 at a given engine operational output. As shown in FIG. 2, the flow tap 112 may be separated from the bleed flow path 110 by a tap valve 114, for example to control an amount of flow input to the bleed flow path 110 from the turbomachine 102. However, in the embodiment of FIG. 2, the tap valve 114 is shown configured as a one-way valve configured to prevent backflow through the flow tap 112. It should be appreciated that various other valve arrangements may be provided, for example in the bleed flow path 110, to control an amount of flow through the bleed flow path 110.

It should be appreciated that other sources of pressure may be provided in the bleed assembly 100. For example, a secondary pressure source 116 may provide a secondary tap 118 to the bleed flow path 110. In various embodiments, the secondary pressure source 116 may be a relatively low pressure source, for example a compressor discharge source. As shown in FIG. 2, the secondary pressure source 116 is connected to the bleed flow path 110 by a secondary tap valve 120. The secondary tap valve 120 may be operable to facilitate flow from the secondary pressure source 116 into the bleed flow path 110 and to prevent backflow when pressure in the bleed flow path 110 exceeds pressure of the secondary pressure source 116. It should also be appreciated that the secondary pressure source 116 may also function as a bleed destination from the bleed flow path 110. For example, in high pressure conditions within the bleed flow path 110, the secondary tap valve 120 may be actuated to an open position to relieve pressure into the relatively low pressure environment of the secondary pressure source 116.

Various amounts of flow within the turbomachine 102 and the bleed assembly may be quantified by mass flow rate, a function of mass of the airflow per unit of time. For example, a core mass flow rate may be defined based on a total mass flowed into the turbomachine 102 (i.e., corresponding to the second portion of the air 58 as indicated by arrow 64 in FIG. 1) per unit time. This core mass flow rate may be used to compare with mass flow rates within the bleed flow path 110, for example a bleed mass flow rate representative of a total mass flowed into the bleed flow path 110 per unit time.

One or more flow control devices may be used to regulate mass flow rates within the bleed flow path 110. For example, as shown in FIG. 2 and described above, the tap valve 114 and/or the secondary tap valve 120 may be operable to control an amount of airflow through the turbomachine 102 that is diverted to the bleed flow path 110. Also as shown in FIG. 2, a bleed entry valve 122 may also be provided to regulate the bleed mass flow rate within the bleed flow path 110. As shown, the bleed entry valve 122 is operable to control all pressure sources to the bleed flow path 110. However, it should be understood that pressure sources, such as the flow tap 112 and the secondary tap 118, may be controlled independently of one another.

Still referring to FIG. 2, the bleed flow path 110 is shown in fluid communication with a bleed flow machine 124. As shown, the bleed flow path 110 includes a machine inlet 123 and a machine outlet 125, wherein the bleed flow machine 124 facilitates flow from the machine inlet 123 to the machine outlet 125. The bleed flow machine 124, as described above with reference to FIG. 1, may be operable to perform work with energy in bleed flow, e.g., that bleed flow fed to the bleed flow machine 124 from the compressor section of the turbomachine 102 through the bleed flow path 110. For example, the bleed flow machine 124 may comprise a turbine configured to convert energy in the bleed flow path 110 into mechanical work, which may be referred to as a bleed air turbine or a bleed air expansion turbine. It should be appreciated that such a process may also be employed to the benefit of reducing energy in the bleed flow path 110. For example, the bleed flow machine 124 may be used to reduce pressure or temperature below a safety threshold prior to the bleed flow reaching one or more components or assemblies vulnerable to over-pressure or over-temperature damage.

The bleed flow machine 124 may be operable to transmit energy captured from the bleed flow to one or more components of an aircraft or gas turbine engine. For example, the bleed flow machine 124 may be configured to transmit torque from turbine rotation generated by the bleed flow. The bleed flow machine 124 as shown in FIG. 2 is configured to transmit torque to a machine load 126 through a machine transmission 128. In various embodiments, the machine load 126 may be a drivable mechanical connection with one or more other components. The machine load 126 is configured to receive energy from the bleed flow machine 124, for example torque through the machine transmission 128. The machine load 126 may be configured as an electric device, for example an electric generator. In this example, the machine load 126 may be configured to generate electricity which may then be stored or used in various electric machines, for example the electric machine 31, of a gas turbine engine or associated aircraft. In an embodiment, an electric generator configuration of the machine load 126 is configured to supply electrical energy used to drive the gas turbine engine with the electric machine 31, for example by driving the HP shaft 34 and/or the LP shaft 36. In another embodiment, the machine load 126 is mechanically coupled with the HP shaft 34 and/or the LP shaft 36 and configured to drive the turbomachine 102 with energy supplied from the bleed flow machine 124 through the machine transmission 128.

The machine load 126 may be used to drive the turbomachine 102 as described above, either directly or indirectly. Accordingly, the machine load 126 may be operable to increase or maintain an operational speed of the turbomachine 102. The machine load 126 may thus be used to account for deficiencies in operation of the turbomachine 102, for example those encountered by diverting portions of the core flow through the turbomachine into the bleed flow path 110. In such scenarios, air/fuel ratios and total flow within the combustion section 26 may decrease, decreasing operability margin and potentially increasing the likelihood of stall, surge and/or rich blow out. Decreased operability margin may be accounted for or reversed by increasing rotational speed, and thus flow through the turbomachine 102. For example, greater rotational speed of the turbomachine 102 can increase air/fuel ratios and total flow to account for relatively high flow diverted to the bleed flow path 110. As such, arrangements of the bleed flow machine 124 and the machine load 126 may enable relatively high bleed flow taken from the core flow through the turbomachine 102. For example, the bleed flow may have a bleed mass flow rate, defined as a mass entering the bleed flow path 110 per unit time, of a relatively high percentage of a core mass flow rate, defined as a mass entering the core flow path 37 (see FIG. 1) of the turbomachine 102 per unit time. In various embodiments, the bleed mass flow rate may be at least ten percent, twelve percent, fourteen percent, sixteen percent, eighteen percent, twenty percent, or twenty-two percent of the core mass flow rate. As will be described below, various further configurations may be provided to enable such high bleed flow arrangements.

As described above generally, a relatively high percentage of bleed flow to core flow may facilitate operation of one or more components of an aircraft or gas turbine engine. For example, a relatively high bleed flow may enable effective de-icing in severe conditions and/or with relatively large surface areas to de-ice. As shown in FIG. 2, the machine outlet 125 from the bleed flow machine 124 may feed various bleed flow components. As shown, the bleed flow path 110 downstream of the bleed flow machine 124 extends to an aircraft flow assembly 130 through an aircraft flow valve 132. The aircraft flow assembly 130 may include various components, such as wing anti-icing (WAI) or cabin environmental control system (ECS) components. It should be appreciated that the aircraft flow valve 132 may be configured to control upstream and downstream operation based on an amount of flow permitted through to the aircraft flow assembly 130.

The aircraft flow assembly 130, as described above, refers to any assembly that makes use of bleed flow from the bleed flow path 110. For example, WAI arrangements may be provided to maintain safe temperatures of aircraft wings to avoid icing conditions. The ECS may be provided to maintain safe environmental conditions for the interior compartments of the aircraft. It should be appreciated that the aircraft flow assembly 130 may include various subassemblies, with associated valves and controls to maintain desired control without necessarily affecting operation of upstream components of the bleed assembly 100. Additionally, the aircraft flow assembly 130 may include at least one bleed flow dump (not shown) configured to purge excess bleed flow to an external environment.

Still referring to FIG. 2, the machine outlet 125 from the machine load 126 is further shown to provide bleed flow to a starter assembly 134 through a starter assembly valve 136. The starter assembly 134 may be operable to start a gas turbine engine, for example another gas turbine engine of the same aircraft to which the gas turbine engine and associated bleed assembly 100 are mounted. The starter assembly valve 136 may be operable to control the starter assembly 134, for example to engage a starting mode. In an embodiment, the starter assembly 134 is a pneumatic starter configured to provide flow and subsequent rotation to a gas turbine engine upon operation of the starter assembly valve 136. It should be appreciated that the starter assembly 134 may include various further downstream valves and controls to make use of the bleed flow and control it for preferred starting operations.

In various embodiments, one or more further or alternative bleed flow components may be provided downstream of the bleed flow machine 124. For example, separate circuits may be provided with corresponding separate valve arrangements to each of the ECS and WAI arrangements. Additionally, various embodiments may provide bleed flow components upstream of the bleed flow machine 124. For example, systems requiring or benefitting from relatively high pressures or temperatures may operate from flow that has not passed through the bleed flow machine 124. In an embodiment, a nacelle anti-icing arrangement (NAI) may be configured to tap flow upstream of the bleed flow machine 124 for use in preventing icing conditions in the nacelle 50 (see FIG. 1). As will be discussed in greater detail below, each of the various bleed flow components and assemblies may be configured, sized, and shaped in concert with the upstream bleed flow path 110 to make efficient use of the bleed flow and maintain efficient operation of the turbomachine 102.

Figure 3:
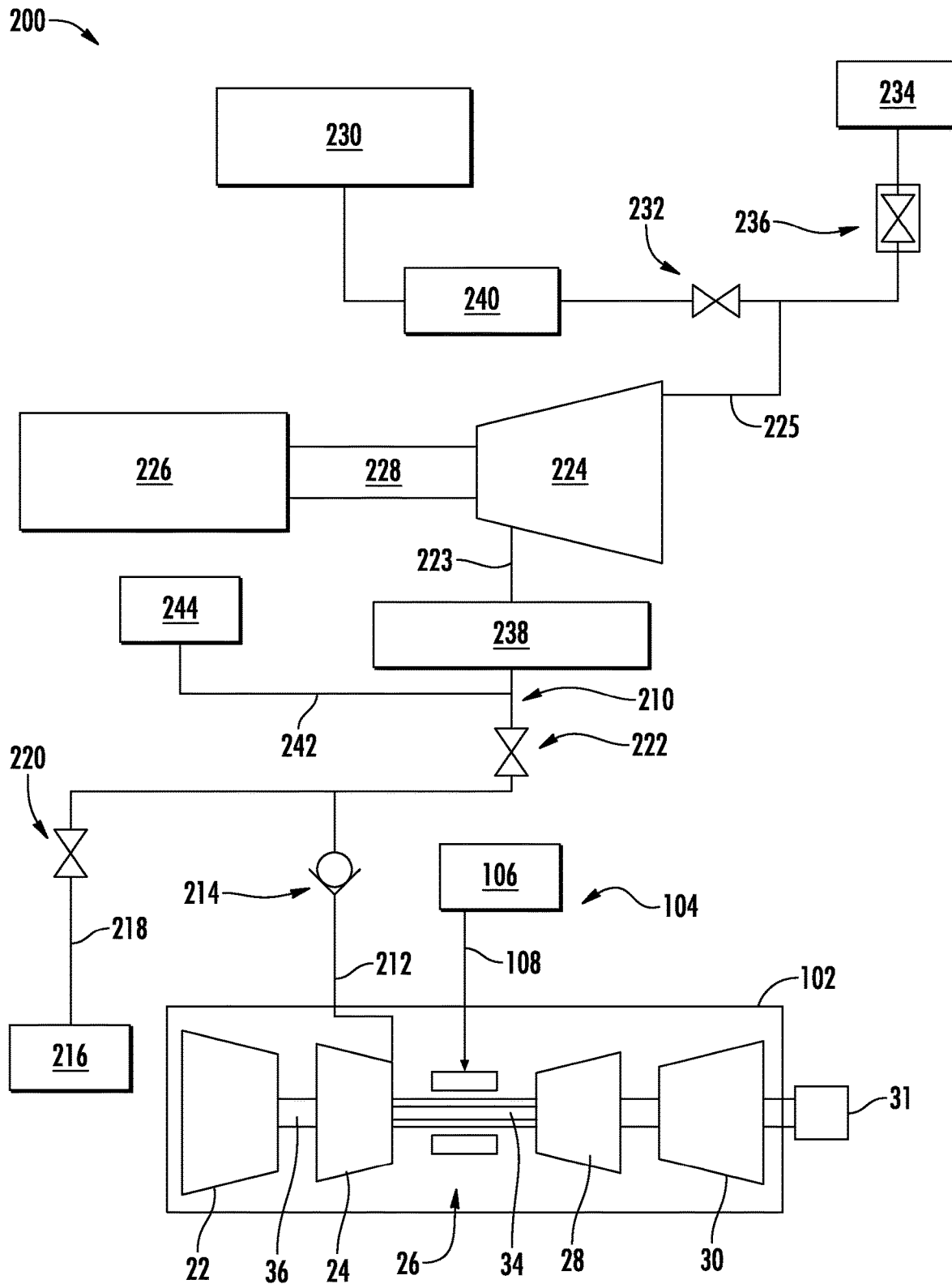
FIG. 3 is a schematic diagram of a bleed assembly for a gas turbine engine in accordance with another exemplary embodiment of the present disclosure.

Turning now to FIG. 3, a schematic diagram is provided of a bleed assembly 200 for a gas turbine engine in accordance with another exemplary embodiment of the present disclosure. The exemplary gas turbine engine of FIG. 3 may be configured in substantially the same manner as the exemplary gas turbine engine 10 described above with reference to FIG. 1, and the exemplary bleed assembly 200 of FIG. 3 may be configured in a similar manner as the exemplary bleed assembly 100 of FIG. 2. For example, the exemplary bleed assembly 200 of FIG. 3 generally includes a turbomachine 102, connected to a bleed flow path 210 through a flow tap 212.

The embodiment depicted in FIG. 3 differs from that in FIG. 2 in that a first heat exchange assembly 238 and a second heat exchange assembly 240 are provided. It should be appreciated that the first and second heat exchange assemblies 238, 240 are merely exemplary and could be provided in various other numbers and arrangements. For example, at least one of the first and second heat exchange assemblies 238, 240 may be configured as a bleed air turbine. As shown in FIG. 3, the first heat exchange assembly 238 is provided downstream of the flow tap 212 and a secondary pressure source 216. As described above with reference to FIG. 2, the secondary pressure source 216 may be operable as a purge or dump of pressure from the flow tap 212 or another source in certain operating conditions, for example when very high compressor bleed is desired and/or when relatively low bleed flow demand exists from various bleed flow components. A secondary tap valve 220 may be operable to control flow to or from the secondary pressure source 216 through a secondary tap 218. As described with reference to FIG. 2, a tap valve 214 may independently control flow between the flow tap 212 and the bleed flow path 210. In certain embodiments, the tap valve 214 may be a check valve configured to prevent back flow.

In various embodiments, one or more of the heat exchange assemblies 238, 240 may be configured to perform additional functions. For example, the first heat exchange assembly 238 may be in temperature communication with a WAI and/or NAI system. In an embodiment, the first heat exchange assembly 238 itself is configured as a WAI system. In this exemplary embodiment, the WAI system may function to transfer heat for de-icing operations, then flowing a reduced-temperature bleed flow to further components as described herein, for example a cabin ECS downstream of the first heat exchange assembly.

The flow tap 212 and secondary tap 218 may be connected to the bleed flow path 210 by a bleed entry valve 222. The bleed entry valve 222 may be operable as a master control for flow through the bleed flow path 210. Downstream of the bleed entry valve 222, the bleed flow path 210 continues to the first heat exchange assembly 238. The first heat exchange assembly 238 may be operable to control properties of the bleed flow prior to entry into a bleed flow machine 224 through a machine inlet 223. For example, the first heat exchange assembly 238 may function to reduce heat in the bleed flow prior to entry into the bleed flow machine 224. In various embodiments, the first heat exchange assembly 238 may be an air-to-air heat exchange assembly, may be liquid cooled, and/or may be cooled evaporatively with a refrigerant cycle.

As shown in FIG. 3, one or more bleed flow components may be configured to receive flow prior to performance of any heat exchange operations. For example, certain bleed flow components may benefit from relatively high temperatures. In the embodiment shown, a pre-exchange outlet 242 may be provided upstream of the first heat exchange assembly 238 in the bleed flow path 210. The pre-exchange outlet 242 is operable to supply uncooled bleed flow to a resistant component 244. The resistant component 244 may be any component of the bleed assembly 200, associated gas turbine engine, and/or aircraft configured to accept relatively high temperature flow. For example, the bleed assembly 200 may be arranged so that a plurality of resistant components 244 are arranged upstream of the first heat exchange assembly 238 and the bleed flow machine 224, where remaining bleed flow components are disposed downstream of the first heat exchange assembly 238 and the bleed flow machine 224. In such a way, the bleed assembly 200 may be efficiently configured to facilitate useful work from the bleed flow path prior to heat and/or pressure conversion operations, which may not be as efficient. It should be appreciated, however, that the first heat exchange assembly 238 may be configured to perform useful work, for example by transmitting heat energy removed from the bleed flow to fuel, aircraft interior air, etc.

In an embodiment, the resistant component 244 may be a nacelle anti-icing (NAI) assembly as described briefly above in reference to FIG. 2. The NAI assembly configuration of the resistant component 244 may function similarly to a WAI assembly. However, the NAI assembly may be relatively less susceptible to heat or pressure damage so may be configured to make use of relatively hot and/or high pressure bleed flow. The NAI assembly may also require relatively low mass flow rates to effectively curb icing risks as compared to WAI assemblies. Accordingly, NAI assemblies may be an example of a system that benefits from a split between heat resistant components 244 distinct from an aircraft flow assembly 230. However, it should also be appreciated that NAI assemblies may also benefit from operations performed by the bleed flow machine 224.

Downstream of the first heat exchange assembly 238, the bleed flow machine 224 is operable to drive a machine load 226 through a machine transmission 228, for example as described above with reference to FIG. 2. A machine outlet 225 is provided and separated from further components by one or more valves. It should be understood that a pressure release or blowoff valve may be independently provided or may be incorporated into one or more of the valves depicted in order to ensure safe operation of the bleed flow machine 224. The valves depicted include an aircraft flow valve 232 connecting the bleed flow path 210 to an aircraft flow assembly and a starter assembly valve 236 connecting the bleed flow path 210 to a starter assembly 234. The configuration of FIG. 3 differs from that shown in FIG. 2 in that the second heat exchange assembly 240 is provided between the bleed flow machine 224 and the aircraft flow assembly 230. For example, the aircraft flow assembly 230 may include one or more components that require further control of flow properties beyond that described with reference to the bleed flow machine 224 and the first heat exchange assembly 238. However, it should be understood that the first heat exchange assembly 238 and the second heat exchange assembly 240 may be provided in the alternative. For example, in a configuration wherein the bleed flow machine 224 is configured for efficient and safe high temperature operation, only the second heat exchange assembly 240 may be provided, with the first heat exchange assembly 238 being omitted.

Figure 4:
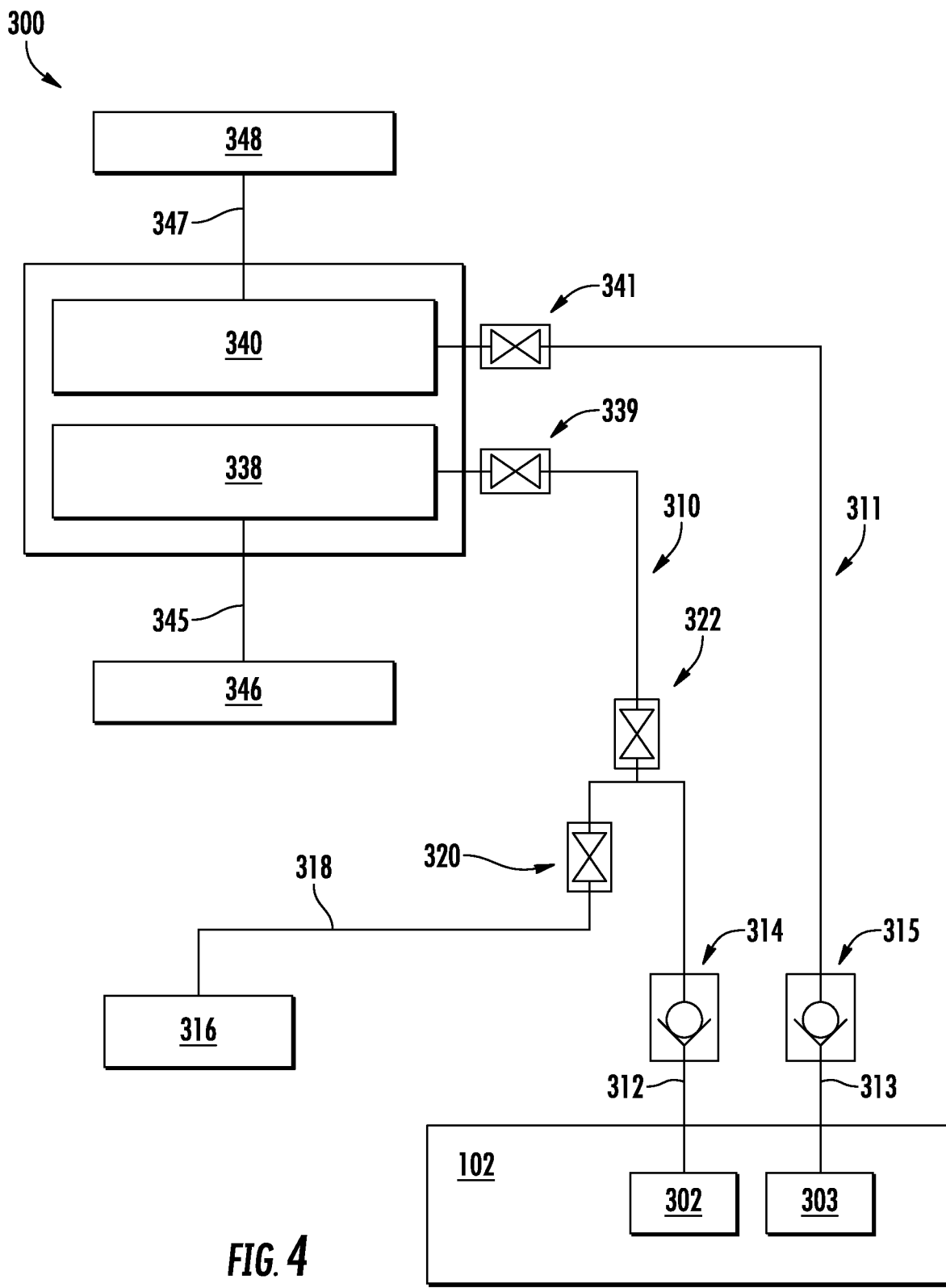
FIG. 4 is a schematic diagram of a bleed assembly for a gas turbine engine in accordance with yet another exemplary embodiment of the present disclosure.

Turning now to FIG. 4, a schematic diagram is provided of a bleed assembly 300 for a gas turbine engine in accordance with another exemplary embodiment of the present disclosure. The exemplary gas turbine engine of FIG. 4 may be configured in substantially the same manner as the exemplary gas turbine engine 10 described above with reference to FIG. 1. For example, the exemplary bleed assembly 300 of FIG. 4 generally includes a turbomachine 102, connected to a first bleed flow path 310 through a first flow tap 312. The embodiment of FIG. 4 differs from the embodiments of FIGS. 2 and 3 in that a second bleed flow path 311 is further provided.

Referring to the first bleed flow path 310, and as generally described above with reference to FIG. 2, a secondary pressure source 316 upstream of the first bleed flow path 310 may be operable as a purge or dump of pressure from the first flow tap 312 or another source in certain operating conditions, for example when very high compressor bleed is desired and/or when relatively low bleed flow demand exists from various bleed flow components. A secondary tap valve 320 may be operable to control flow to or from the secondary pressure source 316 through a secondary tap 318. As described with reference to FIG. 2, a first tap valve 314 may independently control flow between the first flow tap 312 and the first bleed flow path 310. In certain embodiments, the first tap valve 314 may be a check valve configured to prevent back flow. It should be further understood that the second bleed flow path 311 may be divided in a similar manner and may further include such purge or dump facilities.

The first flow tap 312 and secondary tap 318 may be connected to the first bleed flow path 310 by a bleed entry valve 322. The bleed entry valve 322 may be operable as a master control for flow through the first bleed flow path 310. Downstream of the bleed entry valve 322, the first bleed flow path 310 continues to a first heat exchange assembly 338. The first heat exchange assembly 338 may be operable to control properties of the bleed flow downstream of one or more bleed flow components. For example, the first heat exchange assembly 338 may function to reduce heat in the bleed flow prior to entry into a first aircraft flow assembly 346 through a first flow outlet 345. The first aircraft flow assembly 346 may be a cabin environmental control assembly. For example, the first aircraft flow assembly 346 may be a cabin ECS as described generally above. In various embodiments, the first heat exchange assembly 338 may be an air-to-air heat exchange assembly, may be liquid cooled, and/or may be cooled evaporatively with a refrigerant cycle. A first heat exchange assembly valve 339 may be provided upstream of the first heat exchange assembly 338 for independent control of the same.

Referring still to FIG. 4, the first bleed flow path 310 and the second bleed flow path 311 are each depicted as drawing from the turbomachine 102. For example, the turbomachine 102 may be in direct fluid communication with the first flow tap 312 and a second flow tap 313. As depicted, the first flow tap 312 and the second flow tap 313 draw respectively from a first flow source 302 and a second flow source 303. These first and second flow sources 302, 303 may include various components, for example the compressor section of the turbomachine 102 (see FIGS. 1-3). In an embodiment, the first flow source 302 and the second flow source 303 are the same source. For example, the first flow tap 312 and the second flow tap 313 may each draw from the HP compressor 24 (See FIGS. 1-3), and even each from the same stage, such as the fourth stage of the HP compressor 24. However, it should also be understood that the first flow source 302 may represent a different pressure source within the turbomachine from the second flow source 303. For example, the first flow source 302 may be from a component upstream or downstream of the second flow source 303 relative to the core flow through the turbomachine 102. Although not depicted in FIG. 4, it should also be understood that at least one of the first and second flow sources 302, 303 may be provided outside of the turbomachine 102, for example as a compressor discharge source as described above with reference to FIG. 2.

Separation of the first flow source 302 and the second flow source 303 may facilitate separation of the first bleed flow path 310 and the second bleed flow path 311. However, it should also be understood that the first bleed flow path 310 and the second bleed flow path 311 may be separated even in examples where the first flow source 302 and the second flow source 303 are the same. For example, one or more valves, such as check valves, may effectively separate bleed flow between the first bleed flow path 310 and the second bleed flow path 311. In an embodiment where the first flow source 302 and the second flow source 303 are the same, the first tap valve 314 and a second tap valve 315 may cooperate to effectively control downstream flow in the first bleed flow path 310 and the second bleed flow path 311, respectively, independently of one another.

By separating the first bleed flow path 310 from the second bleed flow path 311, bleed flow throughout the bleed assembly 300 can be controlled to maintain high levels of operability of the turbomachine 102 while providing high levels of bleed flow to various bleed flow components. For example, the above-described first bleed flow path 310 may be optimized for control of the first aircraft flow assembly 346, including optimization of all flow conduits, valves, and the first heat exchange 338. When bleed flow is not required for the first aircraft flow assembly 346, flow may be shut off independent of the second bleed flow path 311.

The second bleed flow path 311 may be operated to control a second aircraft flow assembly 348. By separating control of the first aircraft flow assembly 346 from the second aircraft flow assembly 348, each of the first and second bleed flow paths 310, 311 may be configured to efficiently handle its respective tasks. For example, the second aircraft flow assembly 348 may configured as an anti-icing assembly, such as a WAI as described above, and may require relatively high mass flow rates of bleed flow as compared with the first aircraft flow assembly 346. To account for this difference, various features of the second bleed flow path 311 may be configured differently from corresponding features of the first bleed flow path 310. For example, the second flow source 303 may be a relatively hotter and/or higher pressure source as compared with the first flow source 302. In an embodiment, the second flow source 303 comes from a further downstream stage of the same component than the first flow source 302. In another embodiment, the second flow source 303 comes from a further downstream component than the first flow sources 302.

In the second bleed flow path 311, a second heat exchange assembly 340 is provided. Relative to the first heat exchange assembly 338, the second heat exchange assembly 340 may be differently configured. For example, the second heat exchange assembly 340 may be relatively large in comparison with the first heat exchange assembly 338. In an embodiment, the first heat exchange assembly 338 uses a different heat exchange mechanism from the second heat exchange assembly 340. For example, the first heat exchange assembly 338 may employ only air-to-air heat exchange, while the second heat exchange assembly employs liquid and/or evaporative heat exchange.

The second heat exchange assembly 340 may be in fluid communication with the second bleed flow path 311 much the same way as the first heat exchange assembly 338 is in fluid communication with the first bleed flow path 310. For example, as shown in FIG. 4, the second heat exchange assembly 340 is connected with the second bleed flow path 311 through a second heat exchange valve 341. As further shown in FIG. 4, the second heat exchange assembly 340 is connected to the second aircraft flow assembly 348 through a second flow outlet 347.

Figure 5:
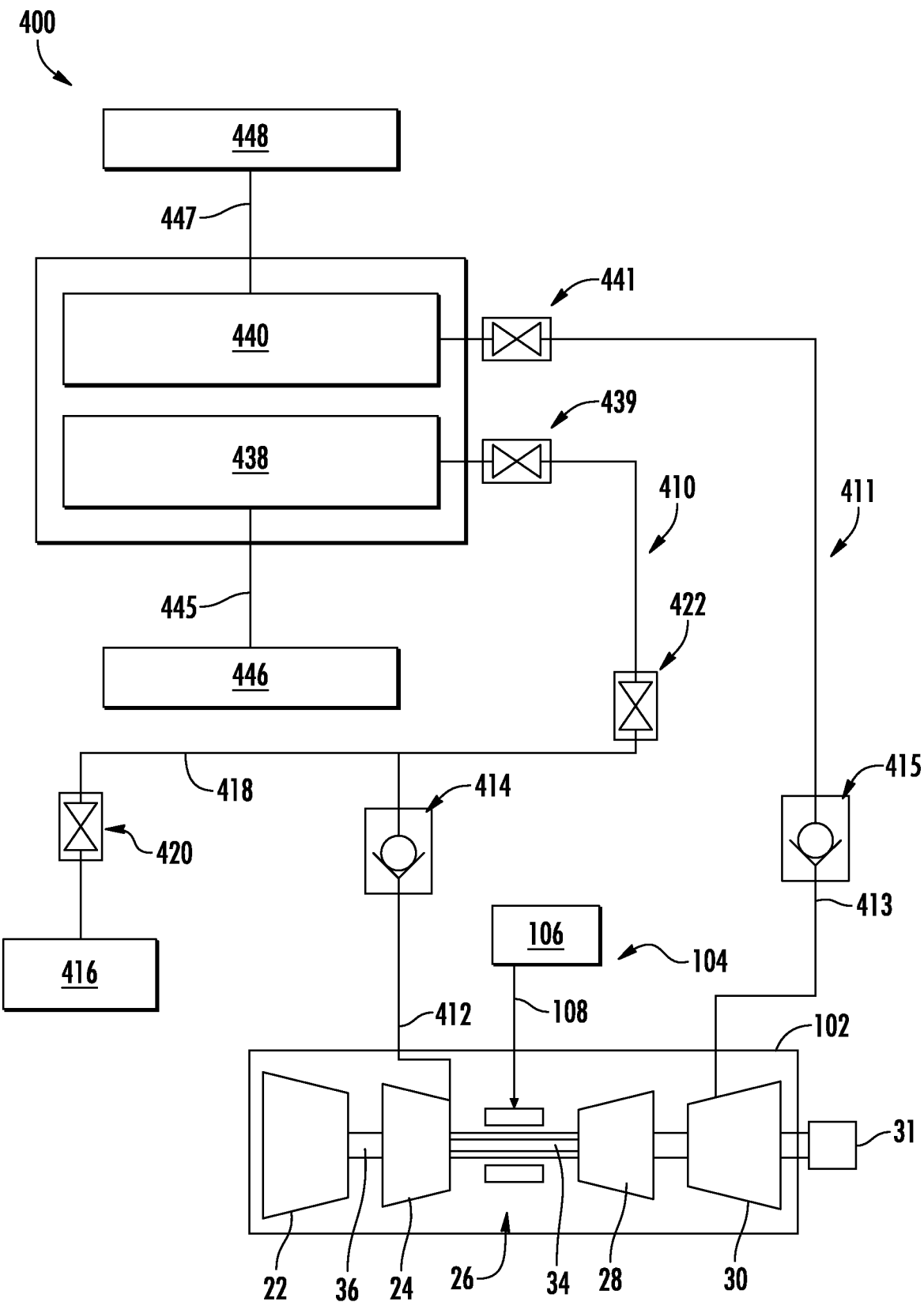
FIG. 5 is a schematic diagram of a bleed assembly for a gas turbine engine in accordance with still another exemplary embodiment of the present disclosure.

Turning now to FIG. 5, a schematic diagram is provided of a bleed assembly 400 for a gas turbine engine in accordance with another exemplary embodiment of the present disclosure. The exemplary gas turbine engine of FIG. 5 may be configured in substantially the same manner as the exemplary gas turbine engine 10 described above with reference to FIG. 1. The exemplary bleed assembly of FIG. 5 may be configured similarly to that in FIG. 4. For example, the exemplary bleed assembly 400 of FIG. 5 generally includes a turbomachine 102, connected to a first bleed flow path 410 through a first flow tap 412 and a second bleed flow path 411 connected to the turbomachine 102 through a second flow tap 413. The embodiment of FIG. 5 differs from the embodiment of FIG. 4 in that the second bleed flow path 411 is connected to the turbomachine 102 through the second flow tap 413 at a location downstream of the combustion section 26. By providing bleed flow to the second flow tap 413 from such a downstream location, bleed flow from upstream locations such as the HP compressor 24 can be reduced while maintaining desired operation of various bleed flow components.

The second flow tap 413 is depicted as drawing from the LP turbine 30, however it could further be provided in various other locations. For example, the second flow tap 413 may be configured as a scoop arranged downstream of the combustion section 26. In various embodiments, the second flow tap 413 includes a turbine rear frame scoop and/or a turbine center frame scoop.

In a related manner to returning energy captured from the bleed flow with a bleed flow machine 74, 124, 224 (see FIGS. 1-3), energy can be captured from a further bleed flow path, such as the second bleed flow path 411 to reduce operability issues stemming from air bleed at the compressor section with the first bleed flow path 410. Accordingly, bleed air from downstream of the combustion section 26 may be used to reduce bleed requirements from upstream of the combustion section 26. As discussed with reference to FIG. 4 above, the first bleed flow path 410 and the second bleed flow path 411 may be configured to manage the requirements of their flow sources and associated bleed flow components. For example, the first bleed flow path 410 depicted in FIG. 5 draws from the HP compressor 24 and feeds to a first aircraft flow assembly 446, which may be a cabin assembly such as a cabin ECS as described above. The second bleed flow path 411 depicted in FIG. 5 draws from the LP turbine 30 and feeds to a second aircraft flow assembly 448, which may be an anti-icing assembly such as a WAI as described above.

Referring to the first bleed flow path 410, and as generally described above with reference to FIG. 2, a secondary pressure source 416 upstream of the first bleed flow path 410 may be operable as a purge or dump of pressure from the first flow tap 412 or another source in certain operating conditions, for example when very high compressor bleed is desired and/or when relatively low bleed flow demand exists from various bleed flow components. A secondary tap valve 420 may be operable to control flow to or from the secondary pressure source 416 through a secondary tap 418. As described with reference to FIG. 2, a first tap valve 414 may independently control flow between the first flow tap 412 and the first bleed flow path 410. In certain embodiments, the first tap valve 414 may be a check valve configured to prevent back flow. A second tap valve 415 may be provided to control flow between the second flow tap 413 and the second bleed flow path 411. It should be further understood that the second bleed flow path 411 may be divided in a similar manner to the first bleed flow path 410 and may further include such purge or dump facilities.

The first flow tap 412 and secondary tap 418 may be connected to the first bleed flow path 410 by a bleed entry valve 422. The bleed entry valve 422 may be operable as a master control for flow through the first bleed flow path 410. Downstream of the bleed entry valve 422, the first bleed flow path 410 continues to a first heat exchange assembly 438. The first heat exchange assembly 438 may be operable to control properties of the bleed flow downstream of one or more bleed flow components. For example, the first heat exchange assembly 438 may function to reduce heat in the bleed flow prior to entry into a first aircraft flow assembly 446 through a first flow outlet 445. The first aircraft flow assembly 446 may be a cabin environmental control assembly. For example, the first aircraft flow assembly 446 may be a cabin ECS as described generally above. In various embodiments, the first heat exchange assembly 438 may be an air-to-air heat exchange assembly, may be liquid cooled, and/or may be cooled evaporatively with a refrigerant cycle. A first heat exchange assembly valve 439 may be provided downstream of the first heat exchange assembly 438 for independent control of the same.

Referring still to FIG. 5, the first bleed flow path 410 and the second bleed flow path 411 are each depicted as drawing from the turbomachine 102. As depicted and described briefly above, the first flow tap 412 and the second flow tap 413 draw respectively from a first flow source upstream of the combustion section 26 relative to the core flow and a second flow source downstream of the combustion section 26 relative to the core flow. Although not depicted in FIG. 5, it should also be understood that at least one of the first and second flow taps 412, 314 may draw from outside of the turbomachine 102, for example as a compressor discharge source as described above with reference to FIG. 2. As described above, the embodiment of FIG. 5 may be configured such that one or both of the first and second bleed flow paths 410, 411 includes a pressure source from outside of the turbomachine 102, for example the secondary pressure source 416.

Separation of a first flow source (shown in FIG. 5 as the HP compressor 24) and a second flow source (shown in FIG. 5 as the LP turbine 30) facilitates separation of the first bleed flow path 410 and the second bleed flow path 411. By separating the first bleed flow path 410 from the second bleed flow path 411, various bleed flow properties can be defined relative to each other. For example, relatively high pressure and temperature flow may be expected from the second bleed flow path 411 sourcing flow from downstream of the combustion section 26. Additionally, different flow handling may be required due to combustion products in the second bleed flow path 411. For example, the second bleed flow path 411 may be preferentially used for systems less sensitive to combustion products, such as WAI and/or NAI operations.

A first mass flow rate through the first bleed flow path 410 may be defined relative to a second mass flow rate through the second bleed flow path 411. In various embodiments, the second mass flow rate may be greater than the first mass flow rate, for example due to higher pressures from its feed source. In an embodiment, the second mass flow rate is at least twice that of the first mass flow rate. Temperatures may also be defined for bleed flows within respective ones of the first bleed flow path 410 and the second bleed flow path 411. For example, the first bleed flow path 410 may have a relatively low temperature compared with a temperature of the second bleed flow path 411. As with the mass flow rates, these relative temperature differences may also stem from the respective feed sources, particularly whether downstream or upstream of the combustion section 26.

Various features of the distinct first bleed flow path 410 and second bleed flow path 411 may be sized, shaped, and configured to account for such differences in flow rates and temperatures. For example, the first bleed flow path 410 may be configured for relatively low pressure operation as described above. In an embodiment, a cross-sectional area of the various flow conduits along the first bleed flow path 410 may be greater than a respective cross-sectional area of the various flow conduits along the second bleed flow path 411. In an embodiment, the cross-sectional area of the first flow outlet 445 of the first bleed flow path 410 is at least twice that of a second flow outlet 447 of the second bleed flow path 411.

Still referring to FIG. 5, the first flow outlet 445 of the first bleed flow path 410 is shown to feed a first aircraft flow assembly 446 downstream of the first heat exchange assembly 438. As described with reference to FIG. 4 above, the first aircraft flow assembly 446 may be a cabin environmental control system (ECS), using relatively low bleed flow. The embodiment of FIG. 5 separates the first aircraft flow assembly 446 from combustion products by maintaining separation between the first bleed flow path 410 and the second bleed flow path 411. As described above, this parallel flow path separation facilitates use of flow energy from downstream of the combustion section 26 while avoiding contamination of components such as cabin ECS with combustion products.

The second flow outlet 447 of FIG. 5 feeds a second aircraft flow assembly 448 through a second heat exchange assembly 440 controlled by a second heat exchange assembly valve 441. As described above with reference to FIG. 4, the second aircraft flow assembly 448 may be an anti-icing assembly, such as WAI and/or NAI. The second heat exchange assembly 440 may be sized, shaped, and configured differently relative to the first heat exchange assembly 438, for example to account for temperature differences from the respective flow sources. It should be appreciated that the second heat exchange assembly 440 may require substantially larger sizing than the first heat exchange assembly 438 based at least on the combustion heat energy flowing to the second heat exchange assembly 440. In an embodiment, the second heat exchange assembly 440 has a heat exchange surface area at least twice that of the first heat exchange assembly 438. In another embodiment, the second heat exchange assembly 440 has a heat exchange volume at least twice that of the first heat exchange assembly 438. The second heat exchange assembly 440 may also include different heat exchange mechanisms as described above to adequately cool flow therethrough. In an embodiment, the second heat exchange assembly 440 is configured to manage combustion products through one or more of the above configurations. Furthermore, greater cleaning access and/or corrosion resistance may be provided to facilitate managing combustion product flow.

The second aircraft flow assembly 448 may also be configured to safely manage more heat than the first aircraft flow assembly 446. For example, the second aircraft flow assembly 448 may be configured with a relatively large flow dispersion volume, as with a WAI arrangement. More heat resistant materials may also be employed in the second aircraft flow assembly 448 relative to the first aircraft flow assembly 446.

Figure 6:
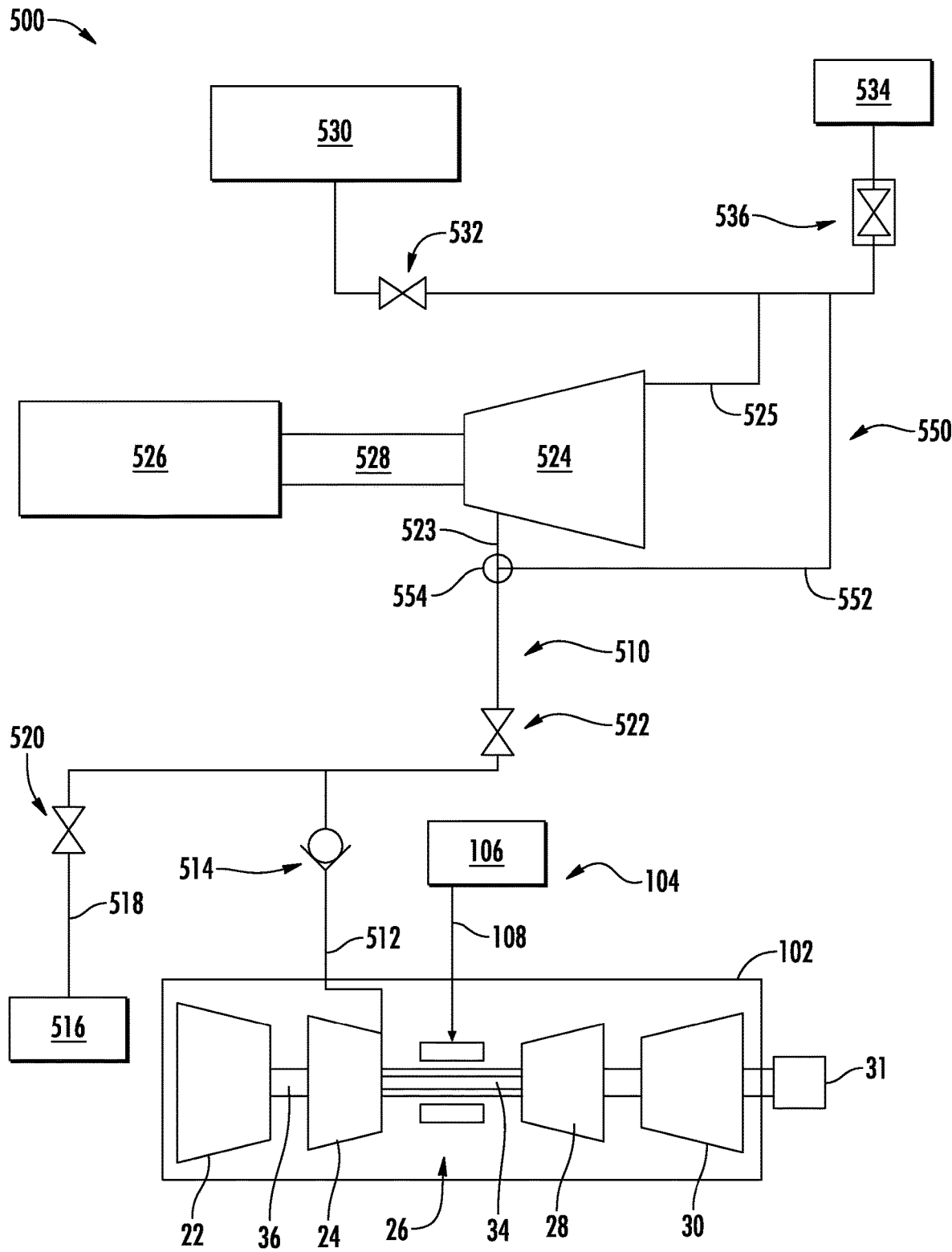
FIG. 6 is a schematic diagram of a bleed assembly for a gas turbine engine in accordance with still another exemplary embodiment of the present disclosure.

Turning now to FIG. 6, a schematic diagram is provided of a bleed assembly 500 for a gas turbine engine in accordance with another exemplary embodiment of the present disclosure. The exemplary gas turbine engine of FIG. 6 may be configured in substantially the same manner as the exemplary turbofan engine 10 described above with reference to FIG. 1, and the exemplary bleed assembly 500 of FIG. 6 may be configured in a similar manner as the exemplary bleed assembly 100 of FIG. 2 and/or the exemplary bleed assembly 200 of FIG. 3. For example, the exemplary bleed assembly 500 of FIG. 6 generally includes a turbomachine 102, connected to a bleed flow path 510 through a flow tap 512.

The embodiment depicted in FIG. 6 differs from those in FIGS. 2 and 3 in that a bleed regulator 550 is provided. The bleed regulator 550 as shown is provided downstream of the turbomachine 102 and upstream of a bleed flow machine 524. The flow tap 512 is in fluid communication with the bleed regulator 550 through a tap valve 514 and a bleed entry valve 522. It should be understood that various other flow configurations to the bleed regulator 550 may be provided. For example, a secondary pressure source 516 may further feed the bleed regulator 550 through a secondary tap 518 controlled by a secondary tap valve 520, as described above with reference to FIGS. 2 and 3.

As described above generally, a relatively high bleed flow may enable operations such as effective de-icing in severe conditions and/or with relatively large surface areas to de-ice. As shown in FIG. 6, a machine outlet 525 from the bleed flow machine 524 may feed various bleed flow components. As shown, the bleed flow path 510 downstream of the bleed flow machine 524 extends to an aircraft flow assembly 530 through an aircraft flow valve 532. The aircraft flow assembly 530 may include various components, such as WAI or cabin ECS components.

The bleed flow machine 524 may be configured to feed such components in various embodiments similar to those described above with reference to FIGS. 2 and 3. For example, the bleed flow machine 524 may be configured to drive a machine load 526 through a machine transmission 528, wherein the machine load 526 is operable to provide torque to the turbomachine 102. As described above, the bleed flow machine 524 may be operable at high bypass flow demands to enable operation of the turbomachine within desired operability ranges. However, there may also be scenarios in which the bleed flow machine 524 will not provide such benefit, for example when bleed flow demand is relatively low or when a large operability margin is present in the turbomachine 102. In such a scenario, the bleed regulator 550 may control an output of the bleed flow machine 524, and subsequently the machine load 526.

The bleed regulator 550 may facilitate a bypass around the bleed flow machine 524 as depicted in FIG. 6. For example, a discrete flow path may be provided with the bleed regulator 550 connecting the bleed flow path 510 upstream of a machine inlet 523 to downstream of the machine outlet 525. In this example, the bleed regulator 550 may comprise a valve, for example a variable flow valve that may infinitely regulate a proportion of flow sent to the bleed flow machine 524. As shown in FIG. 6, this arrangement of the bleed regulator 550 is achieved with a diversion valve 554 upstream of the machine inlet 523 such that it can regulate amounts of flow provided to the machine inlet and a diversion flow path 552. The diversion flow path 552 exits downstream of the machine outlet 525 to feed various bleed flow components. As described below, the bleed regulator 550 may also be provided in a variety of alternative configurations.

In an embodiment, the bleed regulator 550 may be configured as a component of the bleed flow machine 524. For example, the bleed regulator 550 may be integral to the bleed flow machine 524. In an embodiment, the bleed regulator 550 includes a variable component of the bleed flow machine 524. For example, the bleed regulator 550 may control a capture rate of the bleed flow by the bleed flow machine 524. As used herein, the capture rate refers to the amount of energy captured by the bleed flow machine 524 per mass flow rate as described above. In an embodiment, the bleed regulator 550 may control such a capture rate while maintaining a mass flow rate of the bleed flow through the machine outlet 525 of the bleed flow machine 524. Accordingly, the bleed regulator 550 may effectively control resistance to flow within the bleed flow machine 524. It should also be understood that the bleed flow regulator 550 may generally control a total flow rate downstream of the bleed flow machine 524 in its various configurations.

Integral configurations of the bleed regulator 550 with the bleed flow machine 524 may include variable regulation of stators of a bleed air expansion turbine configuration of the bleed flow machine 524 as described generally above. Additionally, features such as exit area of the bleed flow machine 524 may be controlled in operation of the bleed regulator 550. In this example, exit area can be a variable exit area (enabled by a variable area nozzle) that may be increased to reduce capture rate, given the remaining components remain unchanged. It should be appreciated that various methods of controlling a capture rate fall within the scope of this disclosure to effectively control how much energy is retained in the bleed flow and how much is captured, for example to be returned to the turbomachine mechanically and/or electrically.

FIGS. 2 and 6 demonstrate that such configurations can be designed such that no distinct heat exchange assembly is required. For example, the use of a bleed flow machine 124, 524 may sufficiently reduce temperatures and pressures such that they are safe and effective at performing downstream tasks. Referring to FIG. 6, the machine outlet 525 and/or the bleed regulator 550 may feed various bleed flow components as described above without further heat exchange operations. As depicted, this downstream flow feeds the aircraft flow assembly 530 through the aircraft flow valve 532 and a starter assembly 534 through a starter assembly valve 536. However, it should be appreciated that various other assemblies may be provided as described elsewhere herein.

Figure 7:
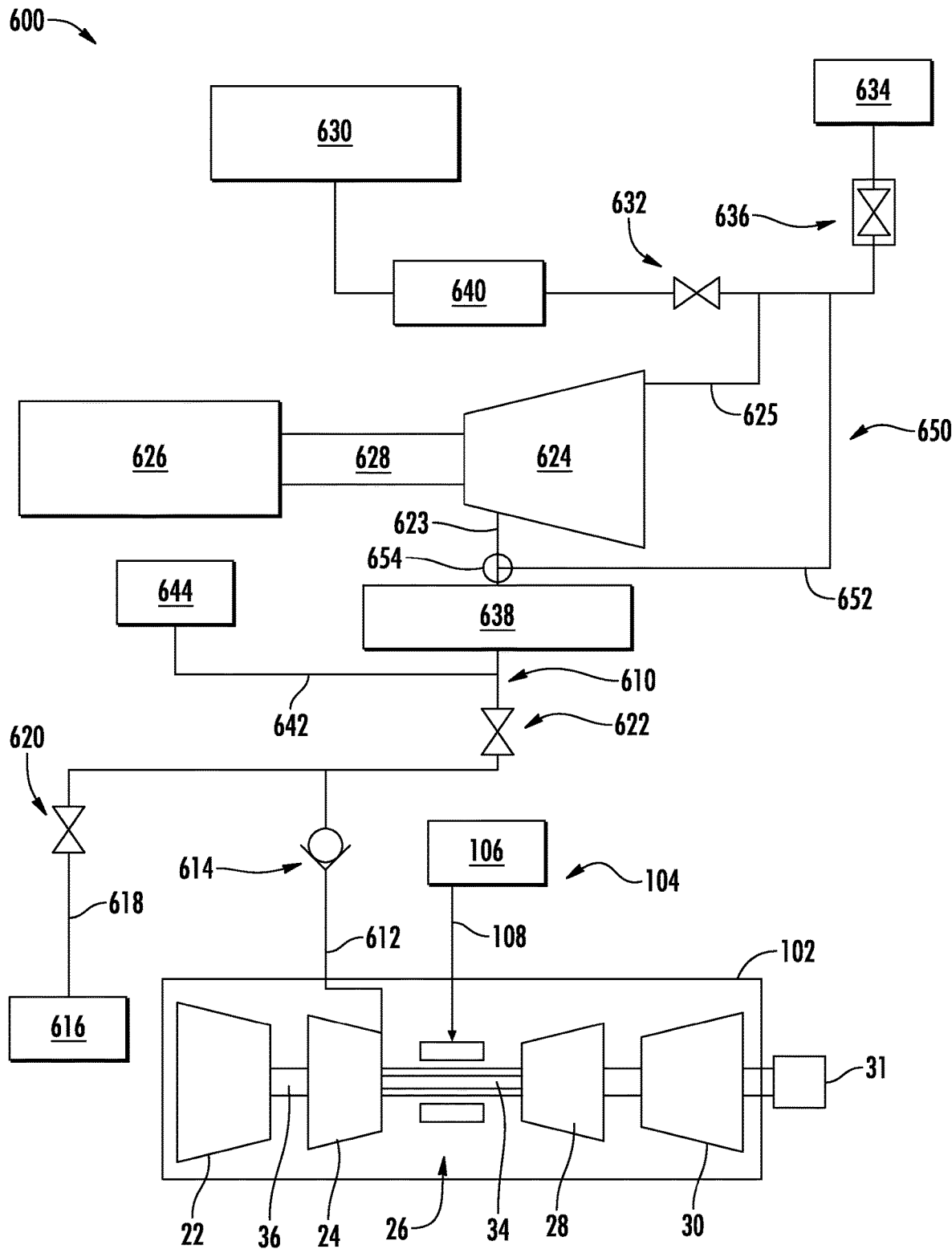
FIG. 7 is a schematic diagram of a bleed assembly for a gas turbine engine in accordance with still another exemplary embodiment of the present disclosure.

Turning now to FIG. 7, a schematic diagram is provided of a bleed assembly 600 for a gas turbine engine in accordance with another exemplary embodiment of the present disclosure. The exemplary gas turbine engine of FIG. 7 may be configured in substantially the same manner as the exemplary turbofan engine 10 described above with reference to FIG. 1, and the exemplary bleed assembly 600 of FIG. 7 may be configured in a similar manner as the exemplary bleed assembly 100 of FIG. 2 and/or the exemplary bleed assembly 200 of FIG. 3. For example, the exemplary bleed assembly 600 of FIG. 7 generally includes a turbomachine 102, connected to a bleed flow path 610 through a flow tap 612.

FIG. 7 differs from that in FIG. 6 in that a first heat exchange assembly 638 and a second heat exchange assembly 640 are provided. It should be appreciated that the first and second heat exchange assemblies 638, 640 are merely exemplary and could be provided in various other numbers and arrangements. As shown in FIG. 6, the first heat exchange assembly 638 is provided downstream of the flow tap 612 and a secondary pressure source 616. As described above with reference to FIG. 2, the secondary pressure source 616 may be operable as a purge or dump of pressure from the flow tap 612 or another source in certain operating conditions, for example when very high compressor bleed is desired and/or when relatively low bleed flow demand exists from various bleed flow components. A secondary tap valve 620 may be operable to control flow to or from the secondary pressure source 616 through a secondary tap 618. As described with reference to FIG. 2, a tap valve 614 may independently control flow between the flow tap 612 and the bleed flow path 610. In certain embodiments, the tap valve 614 may be a check valve configured to prevent back flow.

The flow tap 612 and secondary tap 618 may be connected to the bleed flow path 610 by a bleed entry valve 622. The bleed entry valve 622 may be operable as a master control for flow through the bleed flow path 610. Downstream of the bleed entry valve 622, the bleed flow path 610 continues to the first heat exchange assembly 638. The first heat exchange assembly 638 may be operable to control properties of the bleed flow prior to entry into a bleed flow machine 624 through a machine inlet 623. For example, the first heat exchange assembly 638 may function to reduce heat in the bleed flow prior to entry into the bleed flow machine 624. In various embodiments, the first heat exchange assembly 638 may be an air-to-air heat exchange assembly, may be liquid cooled, and/or may be cooled evaporatively with a refrigerant cycle.

Prior to entering the first heat exchange assembly 638, one or more bleed flow components may be configured to receive flow prior to performance of any heat exchange operations. For example, certain bleed flow components may benefit from relatively high temperatures. In the embodiment shown, and discussed generally with respect to FIG. 3, a pre-exchange outlet 642 may be provided upstream of the first heat exchange assembly 638 in the bleed flow path 610. The pre-exchange outlet 642 is operable to supply uncooled bleed flow to a resistant component 644.

Still referring to FIG. 7, the first heat exchange assembly 638 may be supplemented by or replaced by the second heat exchange assembly 640. As described above, the second heat exchange assembly 640 may also be provided independently of the first heat exchange assembly 638. Selection of which, if any of the heat exchange assemblies 638, 640 may be made on at least the basis of capability of the bleed flow machine 624 and/or desired output of a machine load 626 connected with the bleed flow machine 624 through a bleed flow transmission 628.

As described above with reference to FIG. 6, a machine outlet 625 and/or a bleed regulator 650 may feed various bleed flow components. As depicted, this downstream flow feeds an aircraft flow assembly 630 through an aircraft flow valve 632 and a starter assembly 634 through a starter assembly valve 636. However, the second heat exchange assembly 640 may further be provided, shown in FIG. 7 as upstream to the aircraft flow assembly 630. In an embodiment, the second heat exchange assembly 640 may be provided upstream to only a portion of an aircraft flow assembly, for example a cabin ECS component of such assembly, while being downstream of or on a separate branch relative to another portion, for example a WAI component of such assembly.

As also described above with reference to FIG. 6, a diversion flow path 652 of FIG. 7 may be provided downstream of the turbomachine 102. As shown the diversion flow path 652 is connected to the bleed flow path 610 by a diversion valve 654 downstream of the first heat exchange assembly 638. However, it should also be understood that the diversion valve 654 may be provided upstream of the first heat exchange assembly 638. In an embodiment, a second diversion valve (not shown) is provided upstream of the first heat exchange assembly 638. In such a configuration, further operations are facilitated to control the energy levels of flow provided to downstream components such as the aircraft flow assembly 630 in varying engine operation conditions.

Figure 8:
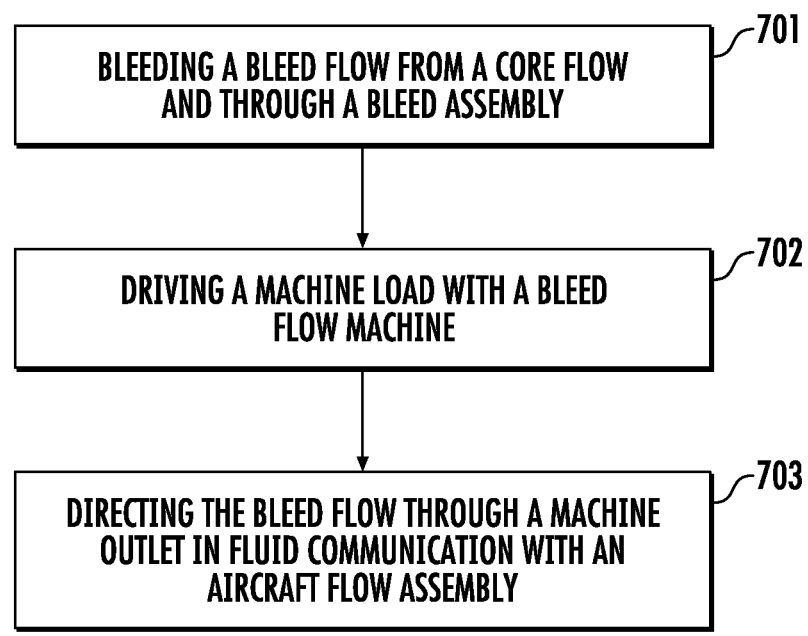
FIG. 8 a flow diagram is provided of a method for operating a gas turbine engine in accordance with an exemplary aspect of the present disclosure.

Referring now to FIG. 8, a flow diagram is provided of a method for operating a gas turbine engine in accordance with a first exemplary aspect of the present disclosure. The method of FIG. 8 may be utilized with one or more of the exemplary gas turbine engines described herein, for example, the exemplary gas turbine engine of FIG. 2 or 3. However, in other exemplary aspects, the method of FIG. 8 may alternatively be utilized with any other suitable gas turbine engine.

The method shown in FIG. 8 includes at 701 bleeding a bleed flow from a core flow and through a bleed assembly. The bleed assembly used in this method may be any of the bleed assemblies 100, 200, 300, 400, 500, 600 as described above, or may be configured in another manner, for example combining features of a plurality of those bleed assemblies. At 702, the method provides driving a machine load with a bleed flow machine. The machine load may be any of the machine loads 126, 226, 526, 626 as described above, or may be configured in another manner, for example combining features of a plurality of those machine loads. Likewise, the bleed flow machine used in this method may be any of the bleed flow machines 124, 224, 524, 624, or may be configured in another manner, for example combining features of a plurality of those bleed flow machines. As above, it should be appreciated that the bleed flow machine at 702 is configured to receive the bleed flow from 701.

Still referring to the method of FIG. 8 at 703, the method provides directing the bleed flow through a machine outlet in fluid communication with an aircraft flow assembly. The machine outlet may be any of the machine outlets 125, 225, 525, 625 as described above, or may be configured in another manner, for example combining features of a plurality of those machine outlets. Likewise, the aircraft flow assembly may be any of the aircraft flow assemblies 130, 230, 530, 630 as described above, or may be configured in another manner, for example combining features of a plurality of those aircraft flow assemblies. In various embodiments, the aircraft flow assembly in 703 may comprise first and second aircraft flow assemblies, for example to provide WAI and cabin ECS as described in greater detail above.

Still referring to the method of FIG. 8 at 703, directing the bleed flow through the machine outlet may in at least certain operating conditions include directing a given quantity of bleed flow to the aircraft flow assembly. For example, as described above, a bleed mass flow rate of the bleed flow may be at least twelve percent (12%) or at least twenty percent (20%) of the core mass flow rate, for example when data indicative of an anti-icing condition is received.

Figure 9:
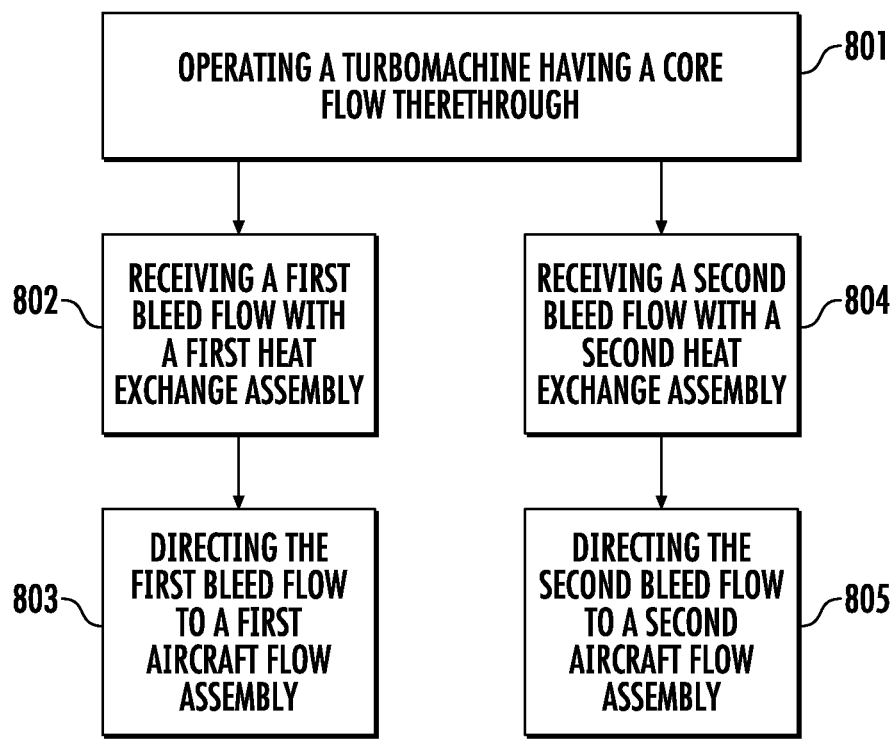
FIG. 9 a flow diagram is provided of a method for operating a gas turbine engine in accordance with another exemplary aspect of the present disclosure.

Referring now to FIG. 9, a flow diagram is provided of a method for operating a gas turbine engine in accordance with a second exemplary aspect of the present disclosure. The method of FIG. 9 may be utilized with one or more of the exemplary gas turbine engines described herein, for example, the exemplary gas turbine engine of FIG. 4 or 5. However, in other exemplary aspects, the method of FIG. 9 may alternatively be utilized with any other suitable gas turbine engine.

The method shown in FIG. 9 includes at 801 operating a turbomachine having a core flow therethrough. The turbomachine used in this method may be the exemplary turbomachines 102 or may be configured in various other manners. At 802, a first bleed flow is received with a first heat exchange assembly. At 804, a second bleed flow is received with a second heat exchange assembly. It should be appreciated that the first and second heat exchange assemblies may correspond to those described above, for example any of heat exchange assemblies 238, 240, 338, 340, 438, 440, 638, 640; or may be configured as any other suitable heat exchange assemblies.

Still referring to the method of FIG. 9, at 803 the first bleed flow is directed to a first aircraft flow assembly. At 805, the second bleed flow is directed to a second aircraft flow assembly. The aircraft flow assemblies at 803 and 805 may be any of the aircraft flow assemblies 130, 230, 530, 630 as described above, or may be configured in another manner, for example combining features of a plurality of those aircraft flow assemblies. In various embodiments, the first aircraft flow assembly at 803 may comprise cabin ECS and the second aircraft flow assembly at 805 may comprise WAI and/or NAI systems as described in greater detail above.

Figure 10:
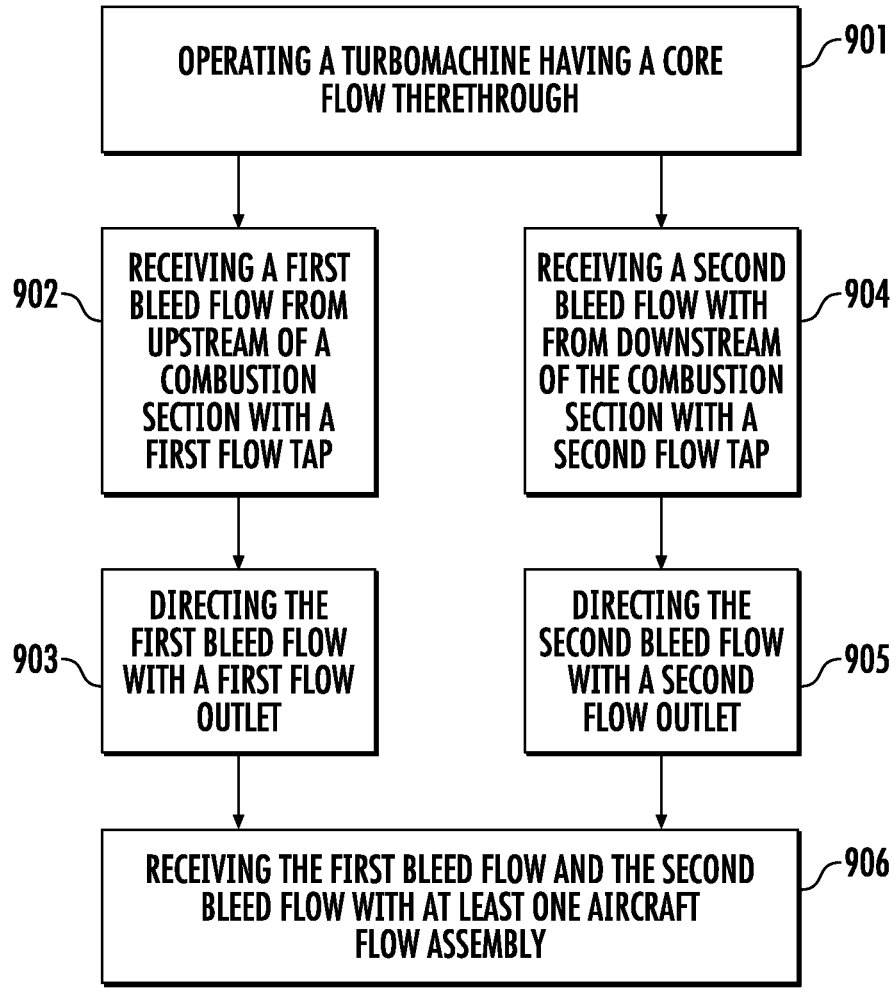
FIG. 10 a flow diagram is provided of a method for operating a gas turbine engine in accordance with yet another exemplary aspect of the present disclosure.

Referring now to FIG. 10, a flow diagram is provided of a method for operating a gas turbine engine in accordance with a third exemplary aspect of the present disclosure. The method of FIG. 10 may be utilized with one or more of the exemplary gas turbine engines described herein, for example, the exemplary gas turbine engine of FIG. 4 or 5. However, in other exemplary aspects, the method of FIG. 10 may alternatively be utilized with any other suitable gas turbine engine.

The method shown in FIG. 10 includes at 901 operating a turbomachine having a core flow therethrough. The turbomachine used in this method may be the exemplary turbomachines 102 or may be configured in various other manners. At 902, a first bleed flow is received from upstream of a combustion section with a first flow tap. At 904, a second bleed flow is received from downstream of the combustion section with a second flow tap. It should be appreciated that the first and second flow taps may correspond to those described above, for example any of flow taps 112, 212, 312, 313, 412, 413, 512, 612; or may be configured as any other suitable flow taps.

Still referring to the method of FIG. 10, at 903 the first bleed flow is directed from the first flow tap with a first flow outlet. At 905, the second bleed flow is directed from the second flow tap with a second flow outlet. The flow outlets at 903 and 905 may be any of the flow outlets 345, 347, 445, 447 as described above, or may be configured in another manner, for example combining features of a plurality of those aircraft flow assemblies.

Still referring to the method of FIG. 10, at 906 the method provides receiving the first bleed flow and the second bleed flow with at least one aircraft flow assembly. The at least one aircraft flow assemblies at 906 may be any of the aircraft flow assemblies 130, 230 530, 630 as described above, or may be configured in another manner, for example combining features of a plurality of those aircraft flow assemblies. In various embodiments, the at least one aircraft flow assembly at 906 may comprise a first aircraft flow assembly and a second aircraft flow assembly as described in greater detail above, for example with reference to the method of FIG. 9.

Figure 11:
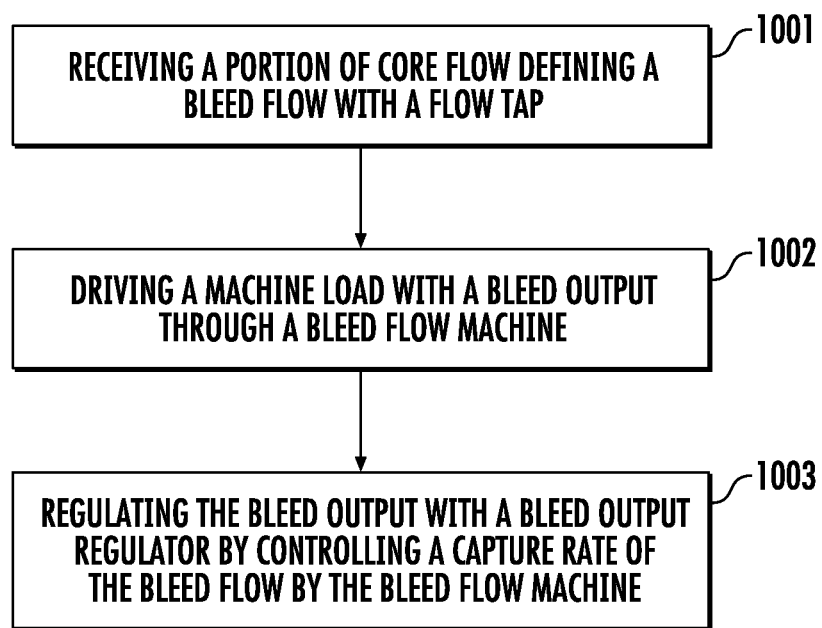
FIG. 11 a flow diagram is provided of a method for operating a gas turbine engine in accordance with yet another an exemplary aspect of the present disclosure.

Referring now to FIG. 11, a flow diagram is provided of a method for operating a gas turbine engine in accordance with a fourth exemplary aspect of the present disclosure. The method of FIG. 11 may be utilized with one or more of the exemplary gas turbine engines described herein, for example, the exemplary gas turbine engine of FIG. 6 or 7. However, in other exemplary aspects, the method of FIG. 11 may alternatively be utilized with any other suitable gas turbine engine.

The method shown in FIG. 11 includes at 1001 receiving a portion of core flow, for example from the exemplary turbomachine 102 described above or other suitable turbomachine or pressure source, a bleed flow with a flow tap. It should be appreciated that the flow tap at 1001 may correspond to one or more of those described above, for example any of flow taps 112, 212, 312, 313, 412, 413, 512, 612; or may be configured as any other suitable flow taps.

Still referring to FIG. 11, at 1002 the method provides driving a machine load with a bleed output through a bleed flow machine. The machine load at 1002 may be any of the machine loads 126, 226, 526, 626 as described above, or may be configured in another manner, for example combining features of a plurality of those machine loads. Likewise, the bleed flow machine used in this method may be any of the bleed flow machines 124, 224, 524, 624, or may be configured in another manner, for example combining features of a plurality of those bleed flow machines. As above, it should be appreciated that the bleed flow machine at 1002 is configured to receive the bleed flow from 1001.

Still referring to FIG. 11, at 1003 the method provides regulating a bleed output driving the machine load at 1002 with a bleed regulator. It should be appreciated that the bleed regulator at 1003 may be one of the bleed regulators 550, 650; or may be otherwise configured as described in greater detail with reference to FIGS. 6 and 7. Likewise, controlling a capture rate of the bleed flow by the bleed flow machine may include any of the above-described configurations, for example using variable regulation of stators or variable regulation of an exit area of a bleed air expansion turbine configuration of the bleed flow machine at 1003.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprises: a turbomachine comprising a compressor section, a combustion section, and a turbine section in serial flow order, the turbomachine defining a core flow therethrough during operation, the core flow defining a core mass flow rate; a bleed assembly comprising a bleed flow machine and a machine load, the bleed flow machine in fluid communication with the compressor section of the turbomachine and configured to drive the machine load, and a machine outlet in fluid communication with the bleed assembly, the machine outlet defining a bleed flow therethrough during operation of the gas turbine engine, the bleed flow defining a bleed mass flow rate, wherein the compressor section is configured to provide the bleed flow through the bleed flow machine and the machine outlet to an aircraft flow assembly, wherein the bleed mass flow rate is at least twelve percent (12%) of the core mass flow rate.

The gas turbine engine of any preceding clause wherein the machine load is configured to drive the turbomachine.

The gas turbine engine of any preceding clause wherein the machine outlet defines the bleed flow therethrough during an aircraft wing-icing operation, wherein the bleed mass flow rate is at least twelve percent (12%) of the core mass flow rate during the aircraft wing-icing operation, and wherein the aircraft flow assembly comprises a wing anti-icing assembly.

The gas turbine engine of any preceding clause wherein the bleed mass flow rate is at least twenty percent (20%) of the core mass flow rate.

The gas turbine engine of any preceding clause wherein the aircraft flow assembly comprises an aircraft environmental control system, a wing anti-icing assembly, or both.

The gas turbine engine of any preceding clause wherein the machine load comprises a drivable mechanical connection to the turbomachine.

The gas turbine engine of any preceding clause wherein the machine load comprises an electric generator, the electric generator configured to transmit electrical power to an electric machine, the electric machine configured to drive the turbomachine.

The gas turbine engine of any preceding clause wherein the gas turbine engine further comprises a first heat exchange assembly disposed in serial flow order between the turbomachine and the bleed flow machine.

The gas turbine engine of any preceding clause wherein the gas turbine engine further comprises a second heat exchange assembly disposed in serial flow order between the bleed flow machine and the aircraft flow assembly.

The gas turbine engine of any preceding clause wherein the machine outlet is configured to provide at least a portion of the bleed flow to an air starter assembly.

The gas turbine engine of any preceding clause wherein the gas turbine engine further comprises a bleed regulator configured to bypass the bleed flow machine with at least a portion of the bleed flow from the turbomachine to the machine outlet.

A method of operating a gas turbine engine comprises: operating a turbomachine to provide a core flow through the turbomachine, the core flow defining a core mass flow rate and the turbomachine comprising a compressor section, a combustion section, and a turbine section in serial flow order; bleeding a bleed flow from the core flow and through a bleed assembly, the bleed flow defining a bleed mass flow rate and the bleed assembly comprising a bleed flow machine and a machine load, the bleed flow machine in fluid communication with the compressor section of the turbomachine; driving the machine load with the bleed flow machine; and directing the bleed flow through a machine outlet in fluid communication with the bleed assembly, the machine outlet configured to provide the bleed flow to an aircraft flow assembly, wherein the bleed mass flow rate is at least twelve percent (12%) of the core mass flow rate.

The method of any preceding clause wherein the method further comprises driving the turbomachine with the machine load.

The method of any preceding clause wherein the method further comprises receiving data indicative of an aircraft anti-icing condition; and directing the bleed flow having the bleed mass flow rate of at least twelve percent (12%) of the core mass flow rate to the aircraft flow assembly responsive to receiving data indicative of the aircraft anti-icing condition, wherein the aircraft flow assembly comprises a wing anti-icing assembly.

The method of any preceding clause wherein the bleed mass flow rate is at least twenty percent (20%) of the core mass flow rate.

The method of any preceding clause wherein the method further comprises driving the turbomachine with the machine load by a mechanical connection.

The method of any preceding clause wherein the method further comprises generating electrical power with an electric generator of the machine load; transmitting electrical power from the electric generator to an electric machine; and driving the turbomachine with the electric machine.

The method of any preceding clause wherein the method further comprises cooling the bleed flow with a first heat exchange assembly disposed in serial flow order between the turbomachine and the bleed flow machine.

The method of any preceding clause wherein the machine outlet is configured to provide at least a portion of the bleed flow to an air starter assembly.

The method of any preceding clause wherein the method further comprises bypassing the bleed flow machine with at least a portion of the bleed flow using a bleed regulator from the turbomachine to the machine outlet.

A gas turbine engine comprises: a turbomachine comprising a compressor section, a combustion section, and a turbine section in serial flow order, the turbomachine defining a core flow therethrough during operation; a first heat exchange assembly in fluid communication with the turbomachine for receiving a first bleed flow from the turbomachine; a first flow outlet in fluid communication with the first heat exchange assembly for receiving the first bleed flow from the first heat exchange assembly and providing the first bleed flow to a first aircraft flow assembly; a second heat exchange assembly in fluid communication with the turbomachine for receiving a second bleed flow from the turbomachine; and a second flow outlet in fluid communication with the second heat exchange assembly for receiving the second bleed flow and providing the second bleed flow from the second heat exchange assembly to a second aircraft flow assembly.

The gas turbine engine of any preceding clause wherein the first aircraft flow assembly comprises a cabin environmental control assembly, and the second aircraft flow assembly comprises an anti-icing assembly.

The gas turbine engine of any preceding clause wherein the anti-icing assembly comprises a wing anti-icing assembly.

The gas turbine engine of any preceding clause wherein the anti-icing assembly comprises a nacelle anti-icing assembly.

The gas turbine engine of any preceding clause wherein the first heat exchange assembly is configured to receive the first bleed flow from upstream of the combustion section of the turbomachine, and wherein the second heat exchange assembly is configured to receive the second bleed flow from downstream of the combustion section of the turbomachine.

The gas turbine engine of any preceding clause wherein the first heat exchange assembly is configured to receive the first bleed flow from a high pressure compressor of the compressor section of the turbomachine.

The gas turbine engine of any preceding clause wherein the second heat exchange assembly is configured to receive the second bleed flow from a low pressure turbine of the turbine section of the turbomachine.

The gas turbine engine of any preceding clause wherein the first bleed flow defines a first mass flow rate during operation of the gas turbine engine and the second bleed flow defines a second mass flow rate during operation of the gas turbine engine, wherein the second mass flow rate is greater than the first mass flow rate.

The gas turbine engine of any preceding clause wherein the second mass flow rate is at least twice the first mass flow rate.

The gas turbine engine of any preceding clause wherein the first flow outlet comprises a first cross-sectional area and the second flow outlet comprises a second cross-sectional area, wherein the first cross-sectional area is greater than the second cross-sectional area.

The gas turbine engine of any preceding clause wherein the first cross-sectional area is at least twice the second cross-sectional area.

The gas turbine engine of any preceding clause wherein the first heat exchange assembly comprises a first heat exchange volume and the second heat exchange assembly comprises a second heat exchange volume, the second heat exchange volume being greater than the first heat exchange volume.

A method for operating a gas turbine engine, the gas turbine engine comprising a turbomachine having a core flow therethrough, the turbomachine comprising a compressor section, a combustion section, and a turbine section in serial flow order, the method comprises: receiving, with a first heat exchange assembly, a first bleed flow from the turbomachine; directing, with a first flow outlet, the first bleed flow from the first heat exchange assembly to a first aircraft flow assembly; receiving, with a second heat exchange assembly, a second bleed flow from the turbomachine; directing, with a second flow outlet, the second bleed flow from the second heat exchange assembly to a second aircraft flow assembly.

The method of any preceding clause wherein the first aircraft flow assembly comprises a cabin environmental control assembly, and the second aircraft flow assembly comprises an anti-icing assembly.

The method of any preceding clause wherein the method further comprises: receiving, with the first heat exchange assembly, the first bleed flow from upstream of the combustion section of the turbomachine; and receiving, with the second heat exchange assembly, the second bleed flow from downstream of the combustion section of the turbomachine.

The method of any preceding clause wherein the method further comprises: receiving, with the first heat exchange assembly, the first bleed flow from a high pressure compressor of the compressor section of the turbomachine.

The method of any preceding clause wherein the method further comprises: receiving, with the second heat exchange assembly, the second bleed flow from a low pressure turbine of the turbine section of the turbomachine.

The method of any preceding clause wherein the first bleed flow comprises a first mass flow rate and the second bleed flow comprises a second mass flow rate, wherein the second mass flow rate is greater than the first mass flow rate.

The method of any preceding clause wherein the second mass flow rate is at least twice the first mass flow rate.

The method of any preceding clause wherein the first heat exchange assembly comprises a first heat exchange volume and the second heat exchange assembly comprises a second heat exchange volume, the second heat exchange volume being greater than the first heat exchange volume.

A gas turbine engine comprises a turbomachine comprising a compressor section, a combustion section, and a turbine section in serial flow order, the turbomachine defining a core flow therethrough; a first flow tap configured to receive a first bleed flow from upstream of the combustion section; a first flow outlet in fluid communication with the first flow tap; a second flow tap configured to receive a second bleed flow from downstream of the combustion section; and a second flow outlet in fluid communication with the second flow tap; wherein the first flow outlet and the second flow outlet are configured to direct the first bleed flow and the second bleed flow to at least one aircraft flow assembly.

The gas turbine engine of any preceding clause wherein the first flow outlet is configured to direct the first bleed flow to a first aircraft flow assembly, and the second flow outlet is configured to direct the second bleed flow to a second aircraft flow assembly.

The gas turbine engine of any preceding clause wherein the first aircraft flow assembly comprises a cabin environmental control assembly and wherein the second aircraft flow assembly comprises an anti-icing assembly.

The gas turbine engine of any preceding clause wherein the anti-icing assembly is a wing anti-icing assembly.

The gas turbine engine of any preceding clause wherein the anti-icing assembly is a nacelle anti-icing assembly.

The gas turbine engine of any preceding clause wherein the gas turbine engine further comprises: a first heat exchange assembly configured to receive the first bleed flow from the first flow tap; and a second heat exchange assembly configured to receive the second bleed flow from the second flow tap.

The gas turbine engine of any preceding clause wherein the first flow tap is configured to receive the first bleed flow from a high pressure compressor of the compressor section of the turbomachine.

The gas turbine engine of any preceding clause wherein the second flow tap is configured to receive the second bleed flow from a low pressure turbine of the turbine section of the turbomachine.

The gas turbine engine of any preceding clause wherein the first bleed flow from upstream of the combustion section defines a first mass flow rate during operation and the second bleed flow from downstream of the combustion section defines a second mass flow rate during operation, wherein the second mass flow rate is greater than the first mass flow rate.

The gas turbine engine of any preceding clause wherein the second mass flow rate is at least twice the first mass flow rate.

The gas turbine engine of any preceding clause wherein the first flow outlet comprises a first cross-sectional area and the second flow outlet comprises a second cross-sectional area, wherein the first cross-sectional area is greater than the second cross-sectional area.

The gas turbine engine of any preceding clause wherein the first cross-sectional area is at least twice the second cross-sectional area.

The gas turbine engine of any preceding clause wherein the first heat exchange assembly comprises a first heat exchange volume and the second heat exchange assembly comprises a second heat exchange volume, the second heat exchange volume being greater than the first heat exchange volume.

A method for operating a gas turbine engine, the gas turbine engine comprising a turbomachine having a core flow therethrough, the turbomachine comprising a compressor section, a combustion section, and a turbine section in serial flow order, the method comprises: receiving, with a first flow tap, a first bleed flow from upstream of the combustion section; directing, with a first flow outlet, the first bleed flow from the first flow tap to at least one aircraft flow assembly; receiving, with a second flow tap, a second bleed flow from downstream of the combustion section; directing, with a second flow outlet, the second bleed flow from the second flow tap to the at least one aircraft flow assembly.

The method of any preceding clause wherein the method further comprises: directing, with the first flow outlet, the first bleed flow from the first flow tap to a first aircraft flow assembly; directing, with the second flow outlet, the second bleed flow from the second flow tap to a second aircraft flow assembly.

The method of any preceding clause wherein the method further comprises: receiving, with the first flow tap, the first bleed flow from a high pressure compressor of the compressor section of the turbomachine.

The method of any preceding clause wherein the method further comprises: receiving, with the second flow tap, the second bleed flow from a low pressure turbine of the turbine section of the turbomachine.

The method of any preceding clause wherein the first aircraft flow assembly comprises a cabin environmental control assembly and the second aircraft flow assembly comprises an anti-icing assembly.

The method of any preceding clause wherein the anti-icing assembly is a wing anti-icing assembly.

The method of any preceding clause wherein the anti-icing assembly is a nacelle anti-icing assembly.

A gas turbine engine comprises: a turbomachine comprising a compressor section, a combustion section, and a turbine section in serial flow order, the turbomachine defining a core flow therethrough during operation; a flow tap in fluid communication with the turbomachine, the flow tap configured to receive a portion of the core flow therethrough as a bleed flow; and
a bleed assembly comprising: a machine load; a bleed flow machine disposed in fluid communication with the turbomachine through the flow tap, the bleed flow machine configured to drive the machine load; and a bleed regulator configured to regulate a bleed output provided to the bleed flow machine by controlling a capture rate of the bleed flow by the bleed flow machine.

The gas turbine engine of any preceding clause wherein the gas turbine engine further comprises a flow outlet downstream of the bleed flow machine, wherein the bleed regulator is further configured to control the capture rate of the bleed flow by the bleed flow machine while maintaining a mass flow rate of the bleed flow through the flow outlet.

The gas turbine engine of any preceding clause wherein the bleed regulator comprises: a diversion flow path fluidly connecting the flow tap and the flow outlet and bypassing the bleed flow machine; and a diversion valve disposed upstream of the bleed flow machine, the diversion valve configured to control a diversion flow through the diversion flow path.

The gas turbine engine of any preceding clause wherein the bleed regulator comprises at least one variable bleed feature configured to control the capture rate of the bleed flow by the bleed flow machine.

The gas turbine engine of any preceding clause wherein the at least one variable bleed feature is configured as a component of the bleed flow machine configured to regulate a flow out of the bleed flow machine.

The gas turbine engine of any preceding clause wherein the bleed flow comprises a bleed flow mass flow rate and the core flow comprises a core mass flow rate, wherein the bleed mass flow rate is at least twelve percent (12%) of the core mass flow rate.

The gas turbine engine of any preceding clause wherein the gas turbine engine further comprises an aircraft flow assembly in fluid communication with the bleed assembly, wherein the flow assembly comprises at least one of: a wing anti-icing assembly; a nacelle anti-icing assembly; or a cabin environmental control assembly.

The gas turbine engine of any preceding clause wherein the machine load comprises a drivable mechanical connection to the turbomachine.

The gas turbine engine of any preceding clause wherein the machine load comprises an electric generator, the electric generator configured to transmit electrical power to an electric machine, the electric machine configured to drive the turbomachine.

The gas turbine engine of any preceding clause wherein the gas turbine engine further comprises a first heat exchange assembly disposed in serial flow order between the turbomachine and the bleed flow machine.

The gas turbine engine of any preceding clause wherein the gas turbine engine further comprises a second heat exchange assembly disposed in serial flow order between the bleed flow machine and the flow outlet.

The gas turbine engine of any preceding clause wherein the flow outlet is configured to provide at least a portion of the bleed flow to an air starter assembly.

A method of operating a gas turbine engine, the gas turbine engine comprising a turbomachine having a core flow therethrough, the turbomachine comprising a compressor section, a combustion section, and a turbine section in serial flow order, the method comprising, the method comprises: receiving, with a flow tap in fluid communication with the turbomachine, a portion of the core flow defining a bleed flow; driving a machine load with a bleed output through a bleed flow machine disposed in fluid communication with the turbomachine through the flow tap; and regulating, with a bleed regulator, the bleed output by controlling a capture rate of the bleed flow by the bleed flow machine.

The method of any preceding clause wherein the method further comprises controlling, with the bleed regulator, the capture rate of the bleed flow by the bleed flow machine while maintaining a bleed mass flow rate of the bleed flow through a flow outlet disposed downstream of the bleed flow machine.

The method of any preceding clause wherein the method further comprises controlling, with a diversion valve disposed upstream of the bleed flow machine, a diversion flow through a diversion flow path fluidly connecting the flow tap and the flow outlet and bypassing the bleed flow machine.

The method of any preceding clause wherein the method further comprises controlling, with at least one variable bleed feature of the bleed regulator, the capture rate of the bleed flow by the bleed flow machine.

The method of any preceding clause wherein the at least one variable bleed feature is configured as a component of the bleed flow machine.

The method of any preceding clause wherein the method further comprises regulating, with the at least one variable bleed feature, a fluid flow out of the bleed flow machine.

The method of any preceding clause wherein the bleed flow comprises a bleed flow mass flow rate and the core flow comprises a core mass flow rate, wherein the bleed mass flow rate is at least twelve percent (12%) of the core mass flow rate.

The method of any preceding clause wherein the method further comprises: generating electrical power, with an electric generator of the machine load; transmitting the electrical power to an electric machine; and driving the turbomachine with the electric machine.

We claim:
1. A gas turbine engine comprising:
a turbomachine comprising a compressor section, a combustion section, and a turbine section in serial flow order, the turbomachine defining a core flow therethrough during operation;
a first heat exchange assembly in fluid communication with the turbomachine for receiving a first bleed flow from the turbomachine through a first bleed flow path;
a first heat exchange assembly valve located upstream of the first heat exchange assembly for control of the first bleed flow to the first heat exchange assembly;
a bleed entry valve upstream of the first heat exchange assembly valve and configured to control the first bleed flow to the first heat exchange assembly valve;
a first tap valve upstream of the bleed entry valve and configured to control the first bleed flow from the turbomachine;
a secondary tap valve upstream of the of the bleed entry valve and configured to control a flow between a secondary pressure source and the bleed entry valve;
a first flow outlet in fluid communication with the first heat exchange assembly for receiving the first bleed flow from the first heat exchange assembly and providing the first bleed flow to a first aircraft flow assembly;
a second heat exchange assembly in fluid communication with the turbomachine for receiving a second bleed flow from the turbomachine through a second bleed flow path; and
a second flow outlet in fluid communication with the second heat exchange assembly for receiving the second bleed flow and providing the second bleed flow from the second heat exchange assembly to a second aircraft flow assembly;
wherein the first flow outlet is not in communication with the second aircraft flow assembly and wherein the second flow outlet is not in communication with the first aircraft flow assembly;
wherein the first bleed flow path and the second bleed flow path operate independently of one another.

2. The gas turbine engine of claim 1, wherein the first aircraft flow assembly comprises a cabin environmental control assembly, and the second aircraft flow assembly comprises an anti-icing assembly.

3. The gas turbine engine of claim 2, wherein the anti-icing assembly comprises a wing anti-icing assembly.

4. The gas turbine engine of claim 1, wherein the first bleed flow defines a first mass flow rate during operation of the gas turbine engine and the second bleed flow defines a second mass flow rate during operation of the gas turbine engine, wherein the second mass flow rate is greater than the first mass flow rate.

5. The gas turbine engine of claim 4, wherein the second mass flow rate is at least twice the first mass flow rate.

6. The gas turbine engine of claim 1, wherein the first flow outlet comprises a first cross-sectional area and the second flow outlet comprises a second cross-sectional area, wherein the first cross-sectional area is greater than the second cross-sectional area.

7. The gas turbine engine of claim 6, wherein the first cross-sectional area is at least twice the second cross-sectional area.

8. The gas turbine engine of claim 1, wherein the first heat exchange assembly comprises a first heat exchange volume and the second heat exchange assembly comprises a second heat exchange volume, the second heat exchange volume being greater than the first heat exchange volume.

9. The gas turbine engine of claim 1, further comprising:
   a second heat exchange assembly valve located upstream of the second heat exchanger assembly for control of the second bleed flow from the second heat exchanger assembly.

10. The gas turbine engine of claim 9, wherein the first heat exchange assembly valve is independently controllable from the second heat exchange assembly valve.

11. The gas turbine engine of claim 9, further comprising:
    a second tap valve upstream of the second heat exchange assembly and configured to control the second bleed flow from the turbomachine.

12. A method for operating a gas turbine engine, the gas turbine engine comprising a turbomachine having a core flow therethrough, the turbomachine comprising a compressor section, a combustion section, and a turbine section in serial flow order, the method comprising:
    receiving, with a first heat exchange assembly, a first bleed flow from the turbomachine through a first bleed flow path;
    directing, with a first flow outlet, the first bleed flow from the first heat exchange assembly to a first aircraft flow assembly, wherein directing the first bleed flow from the first heat exchange assembly to the first aircraft flow assembly comprises controlling the first bleed flow with a first heat exchange assembly valve located upstream of the first heat exchange assembly, a bleed entry valve upstream of the first heat exchange assembly valve, a first tap valve upstream of the bleed entry valve, and a secondary tap valve upstream of the of the bleed entry valve, the secondary tap valve configured to control a flow between a secondary pressure source and the bleed entry valve;
    receiving, with a second heat exchange assembly, a second bleed flow from a low pressure turbine of the turbine section of the turbomachine through a second bleed flow path; and
    directing, with a second flow outlet, the second bleed flow from the second heat exchange assembly to a second aircraft flow assembly;
    wherein the first flow outlet is not in communication with the second aircraft flow assembly and wherein the second flow outlet is not in communication with the first aircraft flow assembly; and
    wherein the first bleed flow path and the second bleed flow path operate independently of one another.

13. The method of claim 12, wherein the first aircraft flow assembly comprises a cabin environmental control assembly, and the second aircraft flow assembly comprises an anti-icing assembly.

14. The method of claim 12, wherein the first bleed flow comprises a first mass flow rate and the second bleed flow comprises a second mass flow rate, wherein the second mass flow rate is greater than the first mass flow rate.

15. The method of claim 12, wherein directing the second bleed flow from the second heat exchange assembly to the second aircraft flow assembly comprises controlling the second bleed flow with a second heat exchange assembly valve.

16. The method of claim 15, wherein controlling the first bleed flow with the first heat exchange assembly valve comprises controlling the first bleed flow with the first heat exchange assembly valve independently of controlling the second bleed flow with the second heat exchange assembly valve.

* * * * *